United States Patent [19]

Ohta

[11] Patent Number: 5,895,129
[45] Date of Patent: Apr. 20, 1999

[54] OPTICAL APPARATUS

[75] Inventor: Seiya Ohta, Yokohama, Japan

[73] Assignee: Canon Kabushiki Kaisha, Tokyo, Japan

[21] Appl. No.: 09/009,931

[22] Filed: Jan. 21, 1998

[30] Foreign Application Priority Data

Jan. 23, 1997 [JP] Japan ................. 9-024381

[51] Int. Cl.$^6$ ............................................. G03B 13/36
[52] U.S. Cl. ............................................. 396/79; 396/97
[58] Field of Search .................. 396/79–83, 85–87, 396/97; 359/696, 697, 698, 823, 824

[56] References Cited

U.S. PATENT DOCUMENTS

| | | | |
|---|---|---|---|
| 4,907,867 | 3/1990 | Perrin et al. ................. | 396/97 X |
| 4,982,216 | 1/1991 | Kudo et al. ................. | 396/97 |
| 5,124,738 | 6/1992 | Yamashita ................. | 396/97 |
| 5,679,946 | 10/1997 | Mukai et al. ................. | 396/97 X |

*Primary Examiner*—W. B. Perkey
*Attorney, Agent, or Firm*—Fitzpatrick, Cella, Harper & Scinto

[57] ABSTRACT

An optical apparatus has an optical system incorporating a plurality of lenses including at least one movable lens. The optical apparatus detects temperature information or humidity information concerning the temperature or humidity around a structural member of the optical system other than the lenses, and performs, based on the detected information, compensation for a shift of the focal position caused by a change in the temperature or humidity around the structural member.

72 Claims, 18 Drawing Sheets

OPTICAL APPARATUS

BACKGROUND OF THE INVENTION

1. Field of the Invention

The present invention relates to an optical apparatus which incorporates focusing and magnification changing lenses and lens barrel structural mechanisms such as a lens holding mechanism and a lens shifting mechanism.

2. Description of the Related Art

In recent years, rapid progress has been made in the field of optical apparatuses such as cameras in regard to miniaturization of photographing or imaging optical systems and of image sizes of photographing films and solid-state imaging devices. It is also a current trend that plastics are commonly used as the materials of the photographing optical systems and members for holding such optical systems.

The use of plastic materials as the materials of optical systems and holding members offers a great advantage as compared with the case where other kinds of materials are used. For instance, optical elements and members for holding such elements can easily be fabricated by molding, with a large degree of freedom of sizes and shapes. In addition, use of plastic materials is advantageous also from the viewpoint of costs of production. For these reasons, plastics are finding spreading use as the materials of lenses and optical system holding members in finder systems, infrared active focusing units and photographing optical systems.

In general, plastics exhibit greater amounts of changes of physical properties in response to changes in environmental conditions, as compared with inorganic glass materials. For instance, while an organic glass LaK 14 (produced by OHARA) exhibits a coefficient of linear thermal expansion of $57 \times 10^{-7}/°C$., a plastic material PMMA exhibits a coefficient value of $57 \times 10^{-6}/°C$. which is one order of magnitude greater than that of the LaK 14. As to the change in the refractive index, PMMA exhibits a value of $1.0 \times 10^{-4}/°C$. to $1.2 \times 10^{-4}/°C$., which is two orders of magnitude greater than $3.9 \times 10^{-6}/°C$. to $4.4 \times 10^{-2}/°C$. exhibited by the LaK 14 for D rays.

Thus, the plastics exhibit much greater changes of physical constants (refractive index and shapes) in response to change in temperature, as compared with inorganic glass materials. For instance, lenses made of plastics, i.e., so-called plastic lenses, show a considerably greater change of focal length in response to change in temperature, as compared with lenses made of glasses.

Furthermore, the plastics shows greater water absorption than inorganic glass materials. Consequently, optical constants of plastic lenses show a greater amount of change than those exhibited by inorganic lenses in response to change in humidity, as well as to change in temperature.

Thus, the use of plastics as the material of parts of optical systems and members for holding the optical systems poses a problem of greater degrees of change in physical properties and dimensions in response to change in environmental conditions, in particular change in temperature and humidity, although the plastics offer advantages as stated before. For instance, the use of plastics causes various inconveniences in regard to optical performance such as large change in the optical properties such as focal length which is much less critical when inorganic glasses are used as the materials.

Thus, problems have hitherto been pointed out that focal position of an optical system is undesirably varied to create a de-focus condition due to change in environmental conditions, so as to hamper adequate lens control. Influence of de-focus of optical system due to change in environmental condition is becoming more serious because of current trend towards higher image quality realized by digital techniques.

Manufacturers are in a severe competition towards greater magnification of zoom lenses and miniaturization of the same. The de-focus of the optical system due to change in temperature and humidity is quite a significant problem which may cause a critical defect of the products.

Under these circumstance, it is very important that an effective compensation is made for deviation of focal plane caused by changes in environmental conditions.

This requirement will become much more important under the scheme towards higher image quality, greater magnification and miniaturization.

Compensation for the effect produced by changes in environmental conditions have to employ different compensation coefficients when different amounts of compensation have to be employed for different pieces of products or different production lots of products. From the viewpoints of schedule of development, number of steps of production process and production costs, it is quite inconvenient to change a main program each time a different compensation coefficient is adopted.

Problems which are quite serious in optical apparatuses are also caused such as de-focus caused when the optical apparatus is used under conditions different from the conditions under which the optical apparatuses were initially or eventually adjusted.

SUMMARY OF THE INVENTION

It is an object of one aspect of the present invention to provide an optical apparatus of the type having movable lens groups and lens holding members, wherein, in the event of a change in environmental conditions such as temperature and humidity under which the apparatus is used, the loci of movements of the lens groups are adequately controlled in response to such a change so as to compensate for any deviation of the focal position attributable to such a change, thereby ensuring high optical performance of the optical apparatus.

Other objects, features and advantages of the present invention will become clear from the following description of the preferred embodiments taken in conjunction with the accompanying drawings.

DESCRIPTION OF THE PREFERRED EMBODIMENTS

Figure 1:
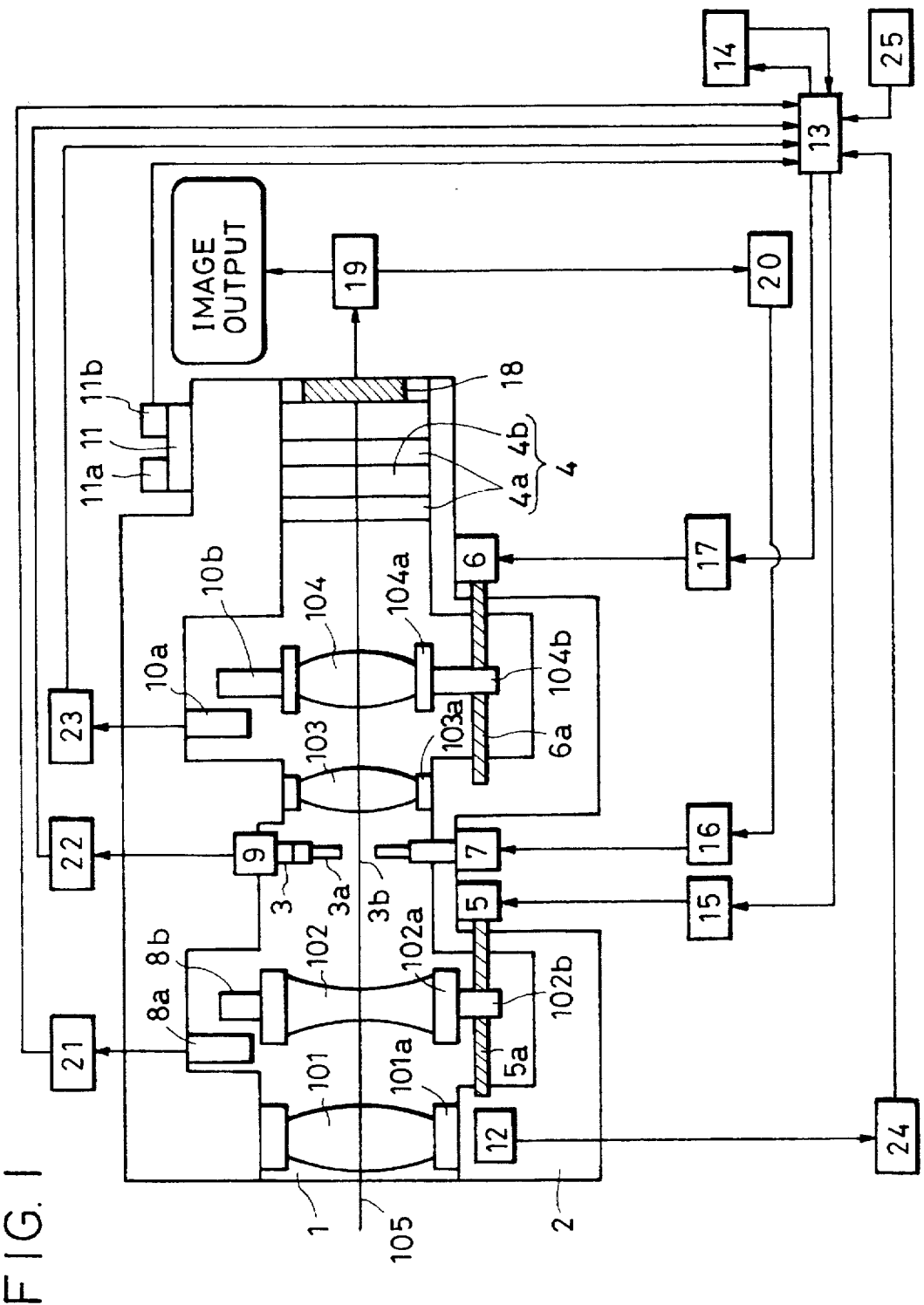
FIG. 1 is a schematic illustration of a critical portion of first, fourth and tenth embodiments of the optical apparatus in accordance with the present invention.

Referring to FIG. 1 schematically showing a critical portion of a first embodiment of the optical apparatus of the present invention, an optical system generally denoted by 1 has a rear-focus zoom lens (referred to as "RFZ lens", hereinafter) composed of four lens groups. More specifically, the RFZ lens 1 includes a first lens group 101 (referred to as "front lens" hereinafter) which is a group of fixed lenses, a second lens group 102 (referred to as a "variator", hereinafter) which is a movable lens group V having magnifying/demagnifying function, a third lens group 103 (referred to as "afocal", hereinafter) which is a group of fixed lenses, and a fourth lens group 104 (referred to as an "RR", hereinafter) which is a group of movable lenses and which has both a function for focusing and a function for effecting compensation for deviation of the focal plane caused by a change in the magnification performed by the second lens group 102.

Each lens group may have a plurality of element lenses. In the illustrated embodiment, for instance, the front lens 101 has three element lenses, the variator 102 has three element lenses, the afocal 103 has one element lens, and RR 104 has two element lenses. Thus, the RFZ lens employs 9 element lenses in total. It is to be noted, however, the described numbers of element lenses used in each group are only illustrative and may be changed as desired.

Numeral 102a denotes a holding member (referred to as a "V shift ring") for holding the variator 102, while 104a denotes a holding member (referred to as "RR shift ring") for holding the RR 104. Both these members are fabricated by molding or machining from a plastic such as glass-fiber-reinforced polycarbonate.

Reference numeral 2 denotes a holding member (referred to as a "lens barrel", hereinafter) for holding the lens groups, which also is formed by molding or machining from a plastic such as polycarbonate.

The described materials of the lens barrel and shift rings, as well as the fabrication methods, are only illustrative and other materials and methods may also be employed. For instance, the lens barrel and shift rings may be made from a metallic material such as aluminum, titanium or the like by die casting, with or without a post-die-casting processing, or machining from a block of such a metallic material.

The lens barrel 2 may be assembled from a plurality of separate parts. No limitation is posed as to the number of the parts of the lens barrel 2. For instance, the lens barrel 2 may be divided into two or more parts at a plane parallel to the optical axis 105 of the RFZ lens 1, or two or more parts at a plane perpendicular to the optical axis 105.

In the illustrated embodiment, the front lens 101 and the afocal 103 are fixed to the respective holding members 101a and 103a which in turn are fixed to the lens barrel 2. Such an arrangement, however, is not exclusive and the front lens 102 and the afocal 103 may be fixed directly to the lens barrel 2, without necessitating the holding members.

Numeral 3 designates an aperture stop member which adjusts the quantity of light incident to a photoelectric conversion device 18 such as a CCD. The arrangement is such that an actuating means 7 such as an iG meter or a stepping motor actuates a blade 3a in the aperture stop member 3 to move the latter in a direction substantially perpendicular to the optical axis 105 so as to vary the area of the aperture 3b of the aperture stop member 3. Numeral 9 designates an aperture encoder which detects the angle of rotation of the iG meter. An aperture control circuit 20 and a driver circuit 16 in cooperation control and drive the actuator means 7 so as to vary the area of the aperture 3b, thereby maintaining the quantity of the light incident to the photoelectric conversion device 18 at a constant level. Numeral 22 designates a detecting circuit which detects a signal from the encoder 9.

In the illustrated embodiment, the mechanical aperture stop member 3, actuating means 7 and the aperture encoder 9 in combination form an aperture unit. This arrangement, however, is only illustrative and the aperture system may be constituted by a so-called physical aperture having, for example, an electrochromic function which controls the transmittance of light by an electro-chemical action.

Numeral 4 designates a filter unit which is disposed in front of the photoelectric conversion device 18 and which has an optical low-pass filter 4a such as of a quartz and an infrared cut-off filter 4b.

In the illustrated embodiment, filters 4a, 4b are integrally disposed at a position immediately preceding the photoelectric conversion device 18 as viewed in the direction of the run of the light rays. This, however, is not exclusive and these filters 4a, 4b may be arranged separately from each other and may be set at any suitable positions in the RFZ lens 1 where these filters can perform their functions.

Numerals 5 and 6 denote lens actuators such as stepper motors for actuating the lens groups 102 and 104. These lens actuators 5, 6 have lead screws 5a, 6a having screw threads formed on their surfaces at constant pitches. Racks 102b, 104b are respectively formed as parts of the V shift ring 102a and the RR shift rings 104a and engage with the lead screws 5a, 6a so that the V shift ring 102a and the RR shift ring 104a move back and forth in parallel with the optical axis 105 in accordance with forward and backward operations of the stepping motors 5, 6, thus causing the variator 102 and the RR 104 to move along the optical axis.

Numerals 8a and 10a denote photo-interrupters which serve as position detecting means. Light shielding plates 8b and 10b are molded integrally with the V shift ring 102a and the RR shift ring 104a from the same material therewith or alternatively, formed separately by machining or the like and then integrated with the V shift ring 102a and the RR shift ring 104a. The arrangement is such that, when the light shielding plates 8b, 10b are brought to the positions of the photo-interrupters 8b, 10b as a result of the operations of the V shift ring 102a and the RR shift ring 104a, levels of the signals from the photo-interrupters 8a, 10a are changed. The reference positions (referred to as "lens initial reset positions", hereinafter) of the variator 102 and the RR 104 are determined in response to the changes in the signal levels. In the illustrated embodiment, the information indicative of the position of each lens relative to its initial reset position is detected in terms of the number of driving pulses required for driving the stepping motor from the state corresponding to the lens initial reset position. Numerals 21 and 23 denote detecting circuits for detecting the signals from the photo-interrupters 8a and 10a.

Although in the illustrated embodiment combinations of photo-interrupters and light-shielding plates are used as the lens initial reset position detecting means, other types of means may be used instead such as combinations of Hall elements and magnets and combinations of PSDs and iREDs.

The combination of the step motors and the lens initial reset position detecting means used in the illustrated embodiment is not exclusive and may be substituted by a combination of an actuator such as a voice coil motor or a D.C. motor and a lens position detecting means such as a combination of a magneto-resistance effect element and a magnet.

Numerals 15 and 17 denote driver circuits for driving the lens actuators 5 and 6.

Numeral 12 denotes a temperature sensing means such as a thermistor or a temperature-sensitive resistor, which also is referred to as a temperature sensor or an environment detecting means. The temperature sensing means 12 has a detecting circuit 24 which delivers to a control circuit 13 such as a microprocessor an output signal corresponding to the temperature sensed by the temperature sensing means.

In the illustrated embodiment, the temperature sensing means is disposed in the vicinity of the front lens 101, because the variation of the focal length in response to a temperature change is largest in regard to this lens group and, hence, most dominant in regar to this lens group among the lens groups.

Numeral 19 designates a camera process circuit which processes the output signal from the photoelectric conversion device 18 and delivers the processing result as an image signal. A storage means (first storage means) which may be a RAM stores control information concerning the controls of the variator 102 and the RR 104. A zoom switch device 11 has a zoom switch 11a which, when pressed, causes a zooming towards the wide-angle end (referred to as "WIDE", hereinafter) and a zooming switch 11b which, when pressed, causes a zooming towards the telephoto end (referred to as "TELE", hereinafter). Thus, the variator 102 and the RR 104 are actuated by driving signals which are produced by the control circuit 13 in response to the pressing of the zooming switches 11a or 11b, whereby the desired zooming operation is performed. Numeral 25 designates a power supply.

The RFZ lens 1 is designed and constructed so as to enable the magnification to be changed while the in-focus state is maintained. To this end, the lens stop position of the variator 102 along the optical axis has been determined for each distance to the photographing object. That is, the position at which the RR 104 is to be stopped along the optical axis has been determined for each zooming position.

Figure 2:
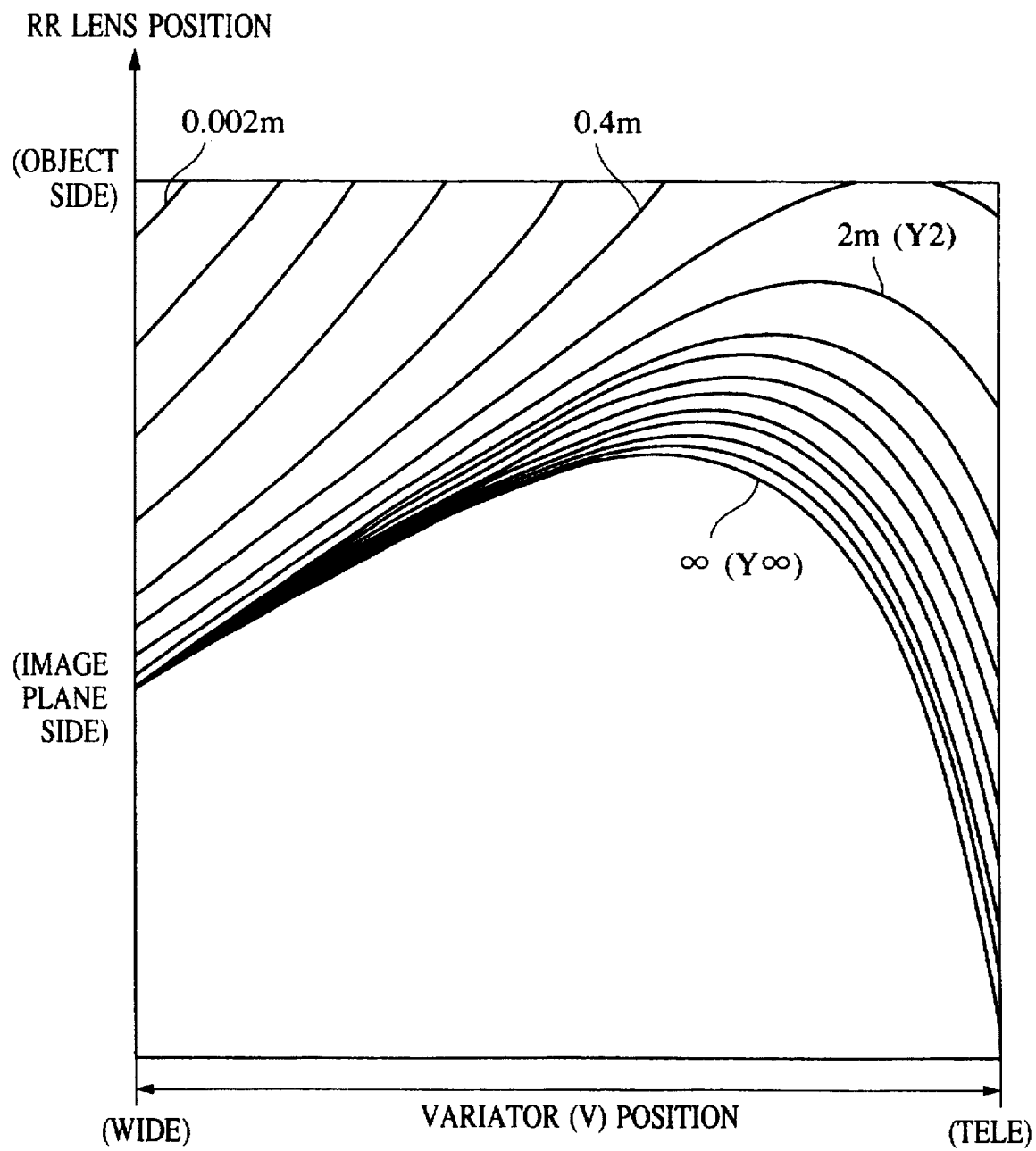
FIG. 2 is a diagram showing the relationship between the position of a variator 102 and the position of an RR 104 in the first embodiment, using the distance to an object as a parameter.

FIG. 2 shows curves representing the stop positions of the variator 102 and the RR 104 along the optical axis for each distance to object. These curves will be referred to as "cam loci", hereinafter.

Referring to FIG. 2, when the distance to the object is infinite (or 2 m), a movement of the variator 102 along the optical axis from the WIDE to the TELE causes the RR lens 104 to move along a curve Y∞ (or Y2) which is convex towards the object.

Thus, in the illustrated embodiment, the variator 102 and the RR 104 are driven and controlled to trace the cam loci in accordance with the distance to the object, during zooming from WIDE to TELE and vice versa, thereby ensuring high quality of image without any de-focus.

In general, however, the optical system tends to allow a variation or change in the distance between the lenses as a result of change in the environment such as temperature, causing a deviation of the imaging plane.

A change in the focal length of each lens group causes a change in the total focal length of the whole RFZ lens 1, with the result that the imaging plane is deviated from the position of the imaging plane which is obtained at a reference temperature T0. In this embodiment, the reference temperature is set to 20° C. but this temperature is only illustrative and the reference may be set to a different temperature. In other words, the whole RFZ lens 1 undesirably provides a de-focus. Therefore, when there is a temperature change $\Delta T$ from the reference temperature T0, it is necessary that the cam contours or loci to be traced by the movable lens groups have is corrected so as to compensate for the de-focus caused by the change $\Delta T$ of the temperature.

Figure 3:
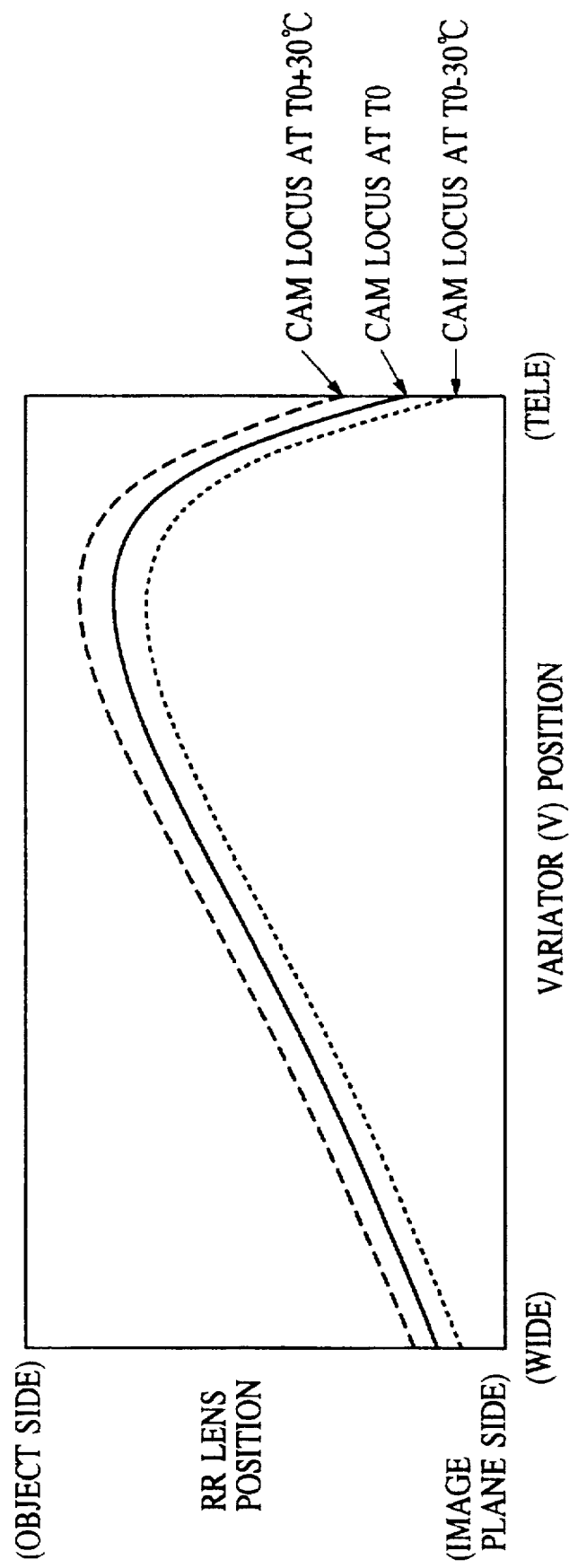
FIG. 3 is an illustration of the locus of a cam as observed when the temperature has been changed from a reference temperature.

FIG. 3 shows, by way of examples, the cam loci which are to be traced when the temperature has been changed from the reference temperature T0 to (T0+30) °C. and (T0−30) °C., respectively, on an assumption that the object is at the TELE end.

In this embodiment, the amount of forward projection of the RR lens 104 towards the object is increased and decreased, respectively, when the temperature is changed to higher side and lower side from the reference temperature T0.

In the illustrated embodiment, the amount of de-focus caused by a change in temperature is greatest when the object is at the TELE end.

In this embodiment, the amount of forward projection of the RR 104 for each value of the focal length is stored in the ROM 14 as the representative position data PRR of the RR 104, by using the position PV of the variator 102 as a parameter (this is equivalent to the use of the focal length of the whole RFZ lens 1 as the parameter), within the ranges of movements of the variator 102 and the RR 104, based on the reference temperature T0.

The ROM 14 also stores the amount of correction of the representative position data PRR per 1 degree of temperature change, i.e., the temperature compensation coefficient CMRR. The temperature compensation coefficient CMRR is the amount or distance to be traveled by the RR 104 for the purpose of compensating for the de-focus which is generated as a result of a change in the distances between the lenses attributable to the change in the geometrical values of the lens holding members, per one degree of change in the temperature.

In this embodiment, the range over which the variator 102 moves is divided into sections at a predetermined length, and the representative position data PRR of the RR 104 and the value of the corresponding temperature compensation coefficient CMRR, for each value of distance to the object, are stored in the ROM 14 for each of the sections of the range over which the variator 102 is movable.

This, however, is not exclusive and it is not absolutely necessary that the position data PV of the variator 102 is divided at a constant pitch. Namely, the representative position data PRR of the RR 104 for each value of the distance to the object, as well as the temperature compensation coefficient CMRR, may be defined as a function of the position data PV concerning the position of the variator 102.

The values of the temperature compensation coefficients CMRR have been computed based on the amounts of de-focus caused by changes in the distances between the lenses attributable to expansion and contraction of the holding members which hold the lens groups. The temperature compensation coefficient CMRR may be determined based on the coefficient of linear thermal expansion of the materials of the lens holding members and the values indicative of the sensitivities of the lenses. It is also understood that the amount of the de-focus may vary from the calculated value, depending on factors such as the method of fixing the lenses. Therefore, the values of temperature compensation coefficients may be determined based on the results of measurements of actual amounts of de-focus in response to a change in the temperature.

Figure 4:
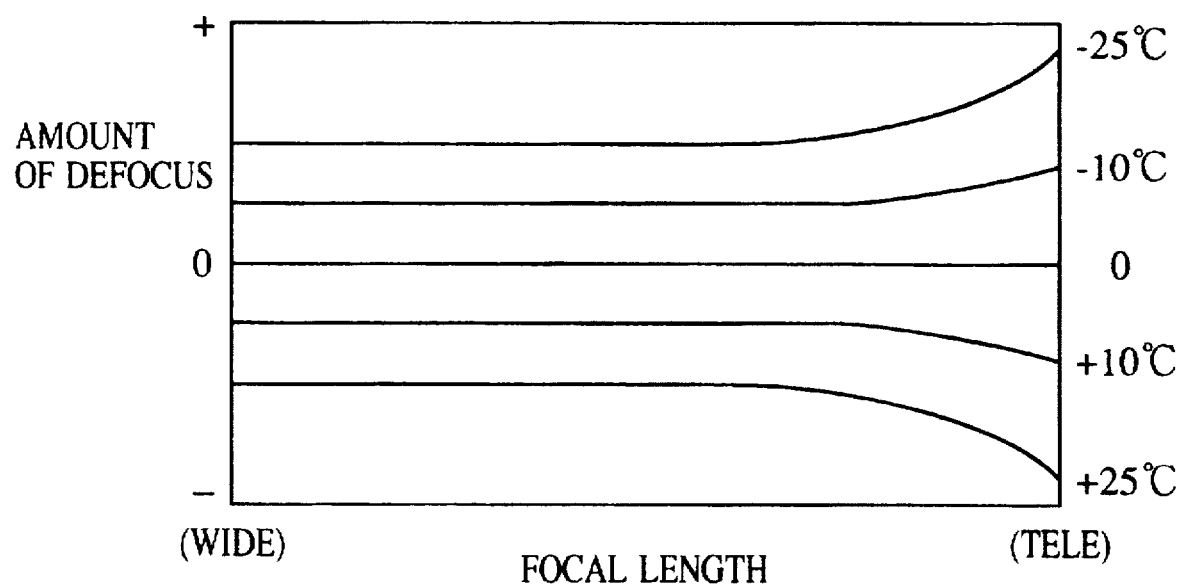
FIG. 4 is an illustration of the amount of de-focus of the focal plane as observed when the temperature has been changed from the reference temperature.
Figure 5:
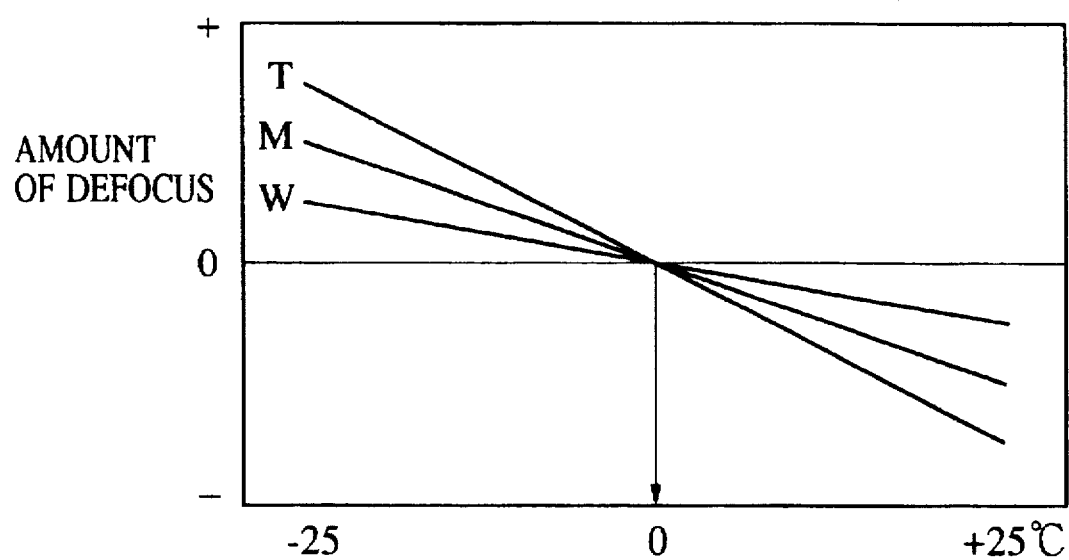
FIG. 5 is an illustration of the amounts of de-focus at a TELE, MIDDLE and WIDE focal lengths.

FIG. 4 shows the amounts of de-focus caused by a change of the temperature from the reference temperature. As will be seen from this Figure, the amount of de-focus varies depending on the focal length. FIG. 5 illustrates the relationship between the amount of change in temperature and the amount of the resultant de-focus, as observed at each of the TELE (T), MIDDLE (M) and WIDE (W) focal lengths. It is understood from this Figure that the amount of de-focus at each focal length has a linear relation to the change in the temperature. It is therefore possible to easily realize a highly accurate compensation by setting, for each value of the focal length, the temperature compensation coefficient CMRR in terms of a gradient of the linear function.

In this embodiment, when the temperature data T obtained through the temperature sensing means 12 and the detecting circuit 24 showed a temperature difference $\Delta T=(T-T0)$ from the reference temperature T0, the representative position data PRR of the RR 104 is corrected by using the temperature compensation coefficient CMRR and the temperature difference $\Delta T$ in accordance with the following equation, thereby determining the corrected position data PRRT indicative of the corrected position of the RR 104.

$$PRRT = CMRR \times \Delta T + PRR \qquad (1)$$

The corrected position data PRRT is the amount of drive of the RR 104 which is required to compensate for the variation or change of the position of the focal plane.

The above-described computation for determining the amount of correction, however, is only illustrative. Thus, in the present invention, the amount of forward projection of the RR 104 in response to change in temperature may be approximated by any desired type of function such as a quadratic equation, cubic equation, quartic equation, exponential function or a logarithmic function.

Figure 6:
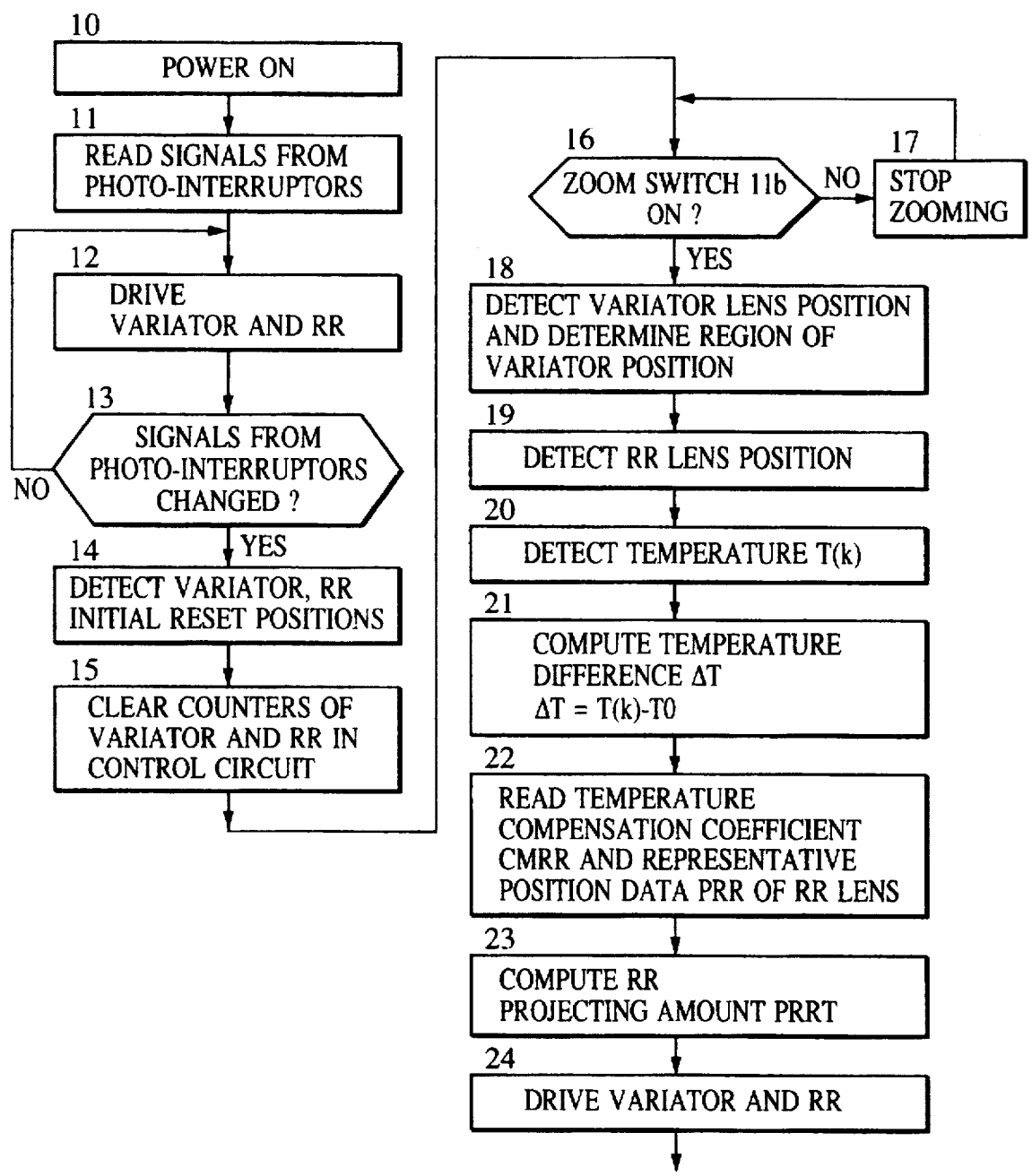
FIG. 6 is a flowchart illustrative of the operation of the first embodiment.

A description will now be given of the operation of this embodiment, with reference to FIG. 6 which is a flowchart illustrative of the operation.

The power is turned on in Step 10, and the signals from the photo-interrupters 8a, 9a are read through the detecting circuits 21 and 23 in Step 11. Then, in Step 12, the control circuit 13 performs such a control as to drive the variator 102 and the RR 104 in directions which are determined by the levels of the signals read through the detecting circuits 21, 23. When the signals read through the detecting circuits 21, 23 are "high", the variator 102 and the RR 104 are driven in such a direction as to render the signal "low", and vice versa. Step 13 determines whether or not the levels of signals from the interrupters 8a, 10a have been changed. If no change is confirmed, the control circuit 13 continues the described control, whereas, if the change is detected, the process proceeds to Step 14.

In Step 14, the position of the variator 102 at which the signal level from the interrupter 8a has changed and the position of the RR 104 at which the signal from the interrupter 10a has changed are determined as the initial reset positions of the variator 102 and the RR 104. The variator 102 and the RR 104 are stopped at these positions and, in Step 15, the counters in the control circuit 13 for the variator 102 and the RR 104 are cleared. These counters are adapted to count the number of driving pulses supplied to drive the variator 102 and the RR 104, respectively. The counters thus cleared are therefore ready for counting the number of driving pulses supplied for driving the variator 102 and the RR 104 from their initial reset positions, thus enabling detection of positions of the variator 102 and the RR 104 relative to the initial reset positions.

Step 16 determines whether or not the zoom switch device 11 has been operated. If the zooming switch 11a has been pressed, a zooming towards WIDE end is performed, whereas, if the switch 11b has been pressed, zooming operation is performed towards the TELE end. No zooming operation is performed when neither the zoom switch 11a nor the zoom switch 11b has been pressed.

The following description is made on an assumption that the zooming towards the TELE end has been selected. It is to be understood, however, that the routine executed when the zooming towards the WIDE end is the same as that of the zooming in the TEL direction.

In Step 18, the position PV of the variator 102 is detected based on the value of the counter, and a search is conducted to determine the range section PVV in which the variator 102 exists.

Similarly, in Step 19, the representative data PRR of the RR 104 corresponding to the region PVV in which the variator 102 exists is read based on the value of the counter.

In Step 20, the signal from the temperature sensor 12 arranged around and in the vicinity of the front lens 101 is supplied to the control circuit 13 through the detecting circuit 24, whereby the temperature T at the location of the temperature sensor 12 is detected. The temperature T as observed at a moment t seconds after the turning on of the power supply is expressed as T(t). The control circuit 13 of this embodiment is practically a microprocessor, and the detected temperature is picked up periodically at the sampling frequency of the microprocessor. Therefore, the temperature T(t) can be expressed as T(k), where "k" indicates the number of cycles of data pickup operations periodically performed since the moment at which the power was turned on. In this embodiment, what is important is that the data train of the detected temperature is a function of the time, and such data train may be expressed in any desired form provided that it is a function of time.

In Step 21, the detected environmental temperature T(k) is compared with the reference temperature T0, whereby the temperature difference $\Delta T=T(k)-T0$ is determined. Thereafter, the temperature compensation coefficient CMRR and the representative position data PRR of the RR 104 are read in Step 22.

Then, the computation in accordance with the aforesaid equation (1) is performed to determine the corrected position data indicative of the amount of correction of the position of RR 104 to be performed, i.e., the amount PRRT of forward projection, in Step 23.

$$PRRT=CMRR \times \Delta T+PRR \quad (1)$$

The variator 102 and the RR 104 are then driven in accordance with the calculated amount PRRT of forward projection, in Step 24.

Although the zooming operation has been described on an assumption that the auto-focus function is not operative during the zooming, it will be understood that the described temperature compensation can be performed substantially in the same manner even if the auto-focusing operation is performed during the zooming.

Figure 7:
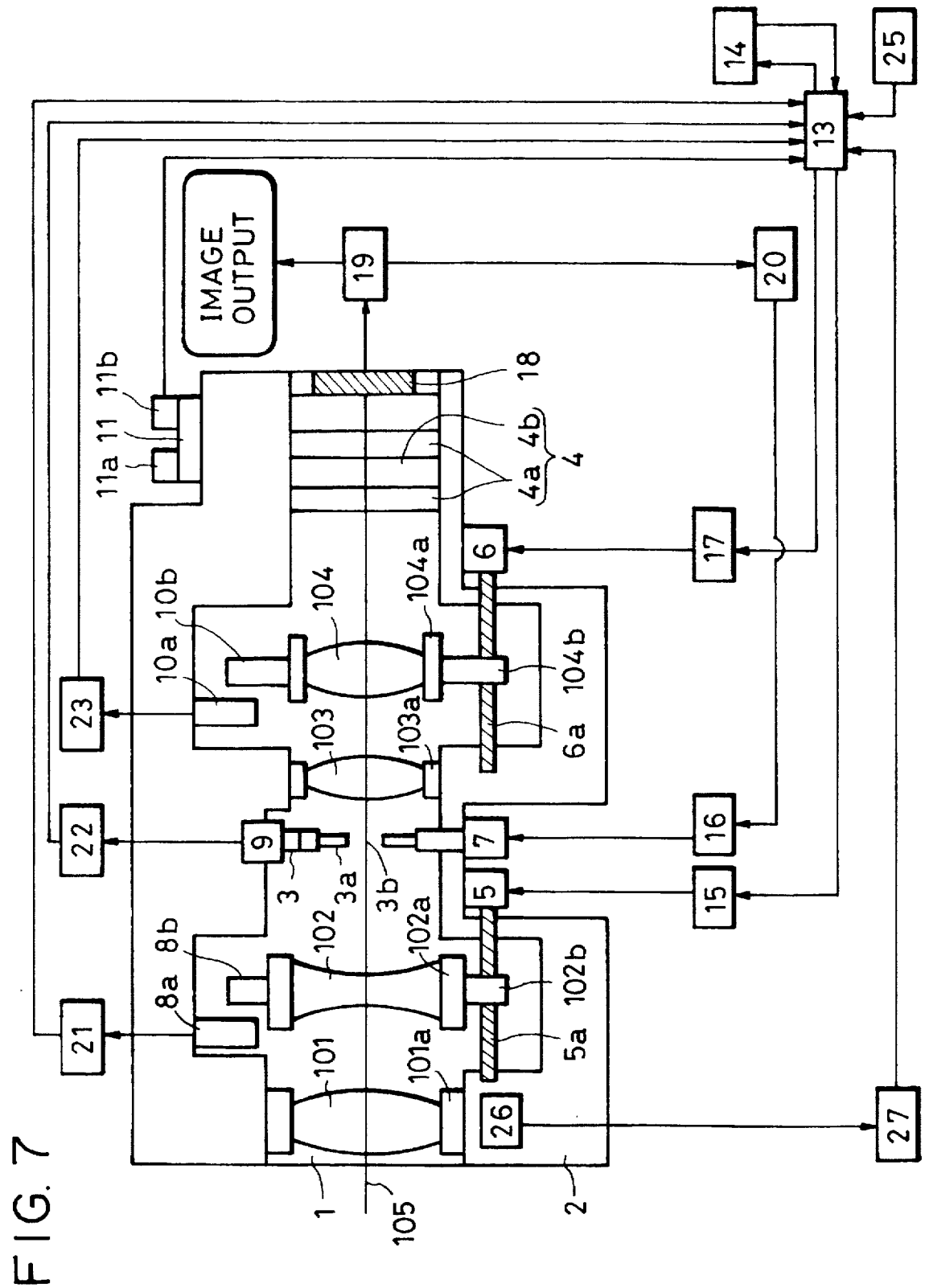
FIG. 7 is an illustration of a critical portion of second, fifth and eleventh embodiments of the optical apparatus in accordance with the present invention.

FIG. 7 shows a critical portion of a second embodiment of the optical apparatus in accordance with the present invention. In this Figure, the same reference numerals are used to denote the parts or components which are the same as those appearing in FIG. 1.

This embodiment is intended to compensate for any de-focus which is caused by a change in environmental conditions, in particular the humidity of atmosphere in which the apparatus is used. Referring to FIG. 7, numeral 26 denotes a humidity sensing means which may be of an electro-static capacitance type or a thermistor type and is referred also as a humidity sensor or an environment detecting means. The humidity sensing means 26 is associated with a detecting circuit 27 which delivers to the control circuit 13 an output signal corresponding to the humidity sensed by the humidity sensing means.

This second embodiment is to effect compensation for any de-focus of the RFZ lens 1 caused by a change in the humidity which is one of the factors of the environmental conditions. The method of compensation is substantially the same as that of the first embodiment. The difference from the compensation performed in the first embodiments resides only in that the temperature sensing means 12, temperature detecting circuit 24 and the temperature compensation coefficient CMRR of the first embodiment are respectively substituted by the humidity sensor 26, humidity detecting circuit 27 and the humidity compensation coefficient HMRR.

A brief description will now be given of the zooming operation performed in this embodiment.

A change in the humidity of the atmosphere in which the optical apparatus is used causes a change in the absorption of moisture of the lens holding members, so that the distances between the lenses vary to cause a change in the focal lengths, resulting in a de-focus of the whole RFZ lens 1. Therefore, a manual-focus zooming operation, when conducted in a humidity different from a reference humidity H0 (it is assumed that the reference humidity has been set to 50%), cannot provide high quality of the image free of any de-focus, if the zooming operation is conducted based on the data concerning the amount of forward projection of the RR 104 determined based on the reference humidity.

This embodiment is to ensure high zooming performance through correction of the representative position data PRR of the RR 104 as obtained at the reference humidity, by using humidity compensation coefficient data, substantially in the same way as the first embodiment.

In this embodiment, the amount of forward projection of the RR 104 for each value of the focal length is stored in the ROM 14 as the representative position data PRR of the RR 104, by using the position PV of the variator 102 as a parameter (this is equivalent to the use of the focal length of the whole RFZ lens 1 as the parameter), within the ranges of movements of the variator 102 and the RR 104, based on the reference humidity H0.

The ROM 14 also stores the amount of correction of the representative position data PRR per 1 percent of humidity change, i.e., the humidity compensation coefficient HMRR. The humidity compensation coefficient HMRR is the amount or distance to be traveled by the RR 104 for the purpose of compensating for the de-focus which is generated as a result of a change in the distances between the lenses attributable to the change in the geometrical values of the lens holding members, per one percent of change in the humidity.

In this embodiment, the range over which the variator 102 moves is divided into sections at a predetermined length, and the representative position data PRR of the RR 104 and the value of the corresponding humidity compensation coefficient HMRR, for each value of the distance from the object, are stored in the ROM 14 for each of the sections of the range over which the variator 102 is movable.

This, however, is not exclusive and it is not always necessary that the position data PV of the variator 102 is divided at a constant pitch. Namely, the representative position data PRR of the RR 104 for each value of the distance to the object, as well as the humidity compensation coefficient CMRR, may be defined as a function of the position data PV concerning the position of the variator 102.

The values of the humidity compensation coefficients HMRR have been computed based on the amounts of de-focus caused by changes in the distances between the lenses attributable to moisture absorption of the holding members which hold the lens groups. The humidity compensation coefficient CMRR may be determined based on, for example, the physical properties of the materials of the lens holding members. It is also understood that the actual amount of the de-focus may differ from the calculated value, depending on factors such as the method of fixing the lenses. Therefore, the values of humidity compensation coefficients may be determined based on the results of measurements of actual amounts of de-focus in response to a change in the humidity.

In this embodiment, when the humidity data H obtained through the humidity sensor 26 and the detection circuit 27 showed a humidity difference $\Delta H=(H-H0)$ from the reference humidity H0, the representative position data PRR of the RR 104 is corrected by using the humidity compensation coefficient HMRR and the humidity difference $\Delta H$ in accordance with the following equation, thereby determining the corrected position data PRRT indicative of the corrected position of the RR 104.

$$PRRT=HMRR \times \Delta H+PRR \quad (2)$$

The above-described computation for determining the amount of correction, however, is only illustrative. Thus, in the present invention, the amount of forward projection of the RR 104 in response to change in temperature may be approximated by any desired type of function such as a quadratic equation, cubic equation, quartic equation, exponential function or a logarithmic function.

The flow of operation of this embodiment is substantially the same as that of the first embodiment. The sole difference is that the temperature employed as the environmental condition factor in the first embodiment is substituted by humidity which is another factor of the environmental conditions.

Figure 8:
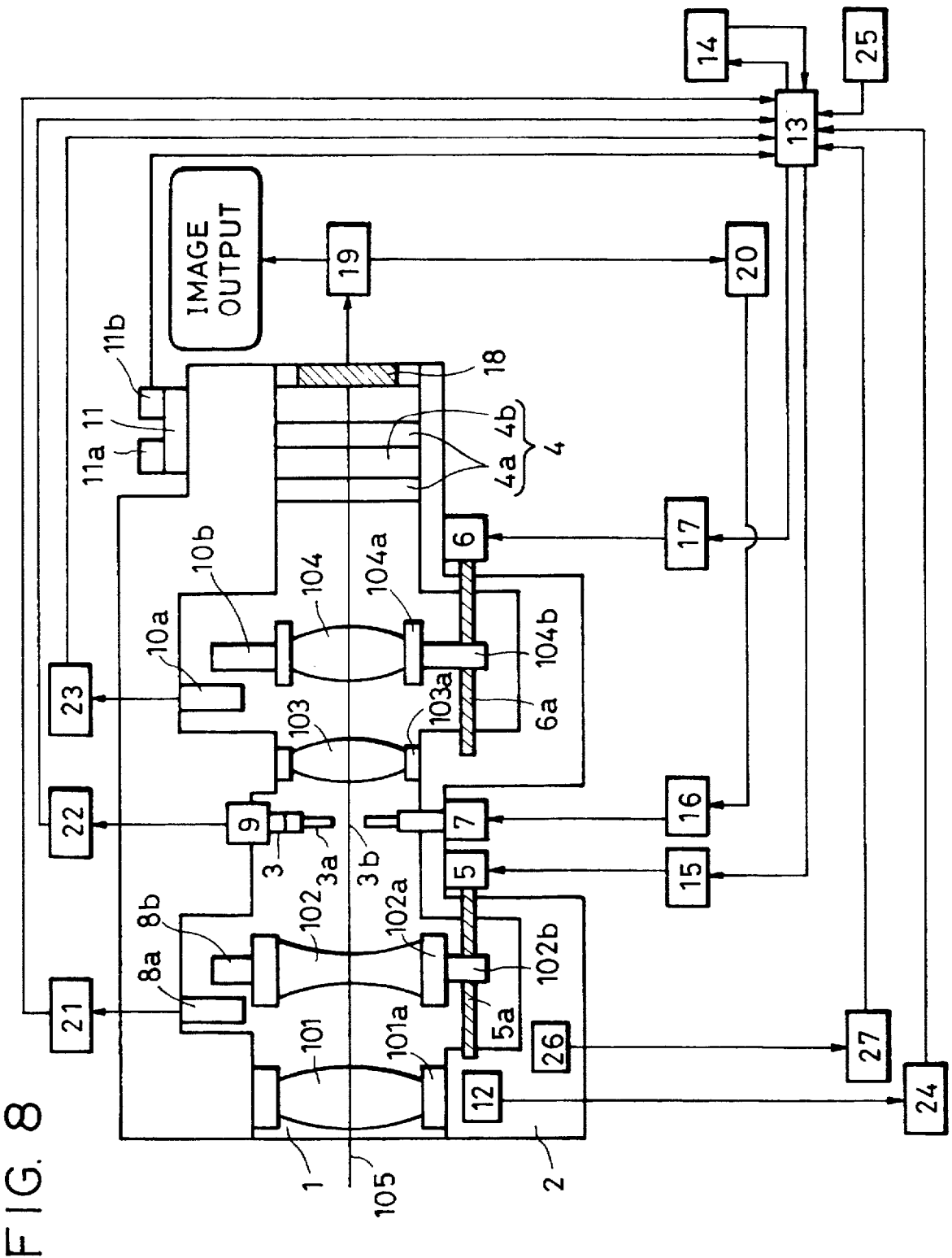
FIG. 8 is a schematic illustration of a third embodiment of the optical apparatus in accordance with the present invention.

FIG. 8 is a schematic illustration of a critical portion of a third embodiment of the optical apparatus in accordance with the present invention. This embodiment has temperature sensing means and humidity sensing means so as to simultaneously effect both a compensation for de-focus attributable to a change in temperature and de-focus attributable to a change in humidity. Numeral 26 denotes the humidity sensing means, while 27 denotes a detecting circuit. Other features of the third embodiment are substantially the same as those of the first embodiment.

The compensation for de-focus due to change in temperature and the compensation for de-focus due to change in the humidity are conducted substantially in the same way as those in the first and second embodiments. More specifically, when a temperature difference $\Delta T=(T-T0)$ from the reference temperature and a humidity difference $\Delta H=(H-H0)$ from the reference humidity have occurred, the representative position data PRR of the RR 104 is corrected in accordance with the following equation (3), so as to compute corrected position data PRRT indicative of the position to which the RR 104 is to be set after the compensation for change in temperature and the compensation for change in humidity.

$$PRRT=(CMRR\times\Delta T)+(HMMR\times\Delta H)+PRR \quad (3)$$

A description will now be given of the fourth embodiment of the optical apparatus in accordance with the present invention. The fourth embodiment employs lens groups substantially the same as those used in the first embodiment excepting that one or more of the lens groups include at least one element lens which is made of a plastic. The plastic lens may be of an acrylic, polyolefin or polycarbonate resins. The invention, however, does not exclude the use of other types of plastics as the material of the lens.

In general, an optical system employing a plastic lens shows a large change of the focal length in response to a change in temperature around the plastic lens due to a change in the environment, since the plastic lens exhibits much greater change in its shape and refractive index as compared with inorganic glass lens. Consequently, a de-focus of the optical system is caused in addition to the de-focus which is caused by a change in the distance between the lens holding members. It is therefore necessary that a compensation is performed in addition to that accomplished by the first embodiment. Thus, the fourth embodiment is intended to effect a temperature compensation for the de-focus caused by a change in the shape and refractive index of the plastic lens, further to the temperature compensation performed by the first embodiment. Thus, the critical portion of the fourth embodiment is substantially the same as that of the first embodiment.

The shift of focal plane of the optical system due to a change in temperature largely varies according to the factors such as the number of the plastic lenses employed and the shapes of the plastic lenses. In the fourth embodiment, the amount of de-focus caused by plastic lenses per unit temperature is calculated and determined as the plastic lens temperature compensation coefficient CPRR, based on the amount of de-focus caused by the change in the focal length of the plastic lens in response to a change of the temperature from the reference temperature T0.

In this embodiment, the ROM 14 stores the plastic lens temperature compensation coefficient CPRR in addition to the aforementioned temperature compensation coefficient CMRR for lens holding members, and the cam loci in accordance with the change in temperature are corrected based on these coefficients so as to easily perform compensation for the de-focus.

Figure 9:
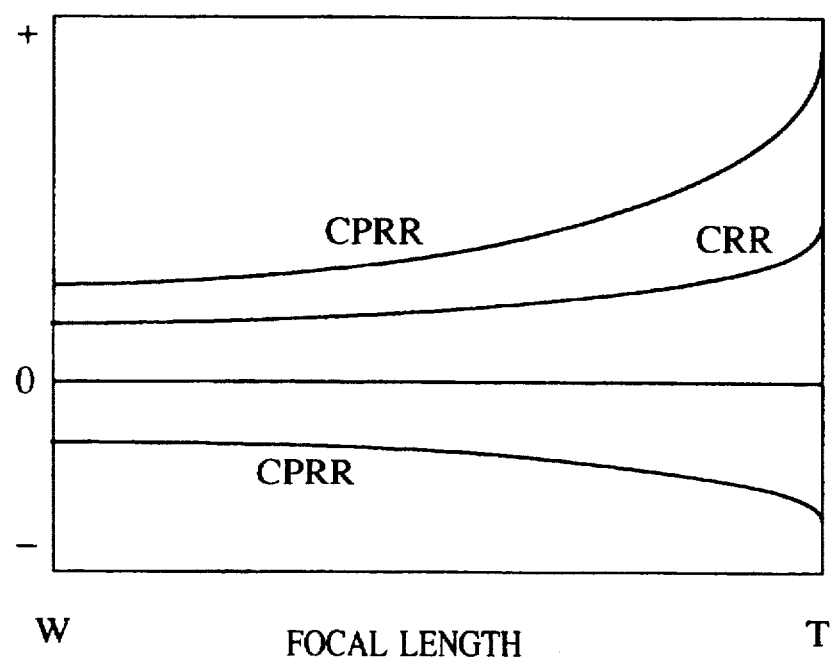
FIG. 9 is a diagram illustrative of the amounts of de-focus based on the temperature compensation coefficients CPRR and CMRR at the respective focal lengths and total variation (total temperature compensation coefficient) CRR.

More specifically, a total temperature compensation coefficient CRR, indicative of the amount of shift of the focal plane of the whole optical system per unit temperature, can be calculated and determined as the sum of the plastic lens temperature compensation coefficient CPRR and the aforesaid temperature compensation coefficient CMRR caused by the change in the distance between the lens holding members. It is possible to implement a more accurate temperature compensation control by using this total temperature compensation coefficient. FIG. 9 illustrates the amount of shift of the focal plane caused by the change in the focal length of the plastic lens and the amount of shift of the focal plane caused by a change in the distance between the holding members, as well as the total amount of shift of the focal plane of the whole optical system.

Assuming that the amount of shift of the focal plane caused by the change in the focal length of the plastic lens and the amount of shift of the focal plane caused by a change in the distance between the holding members are determined based on the output from these same temperature sensing means, the amount $\Delta PRR$ of correction of the RR position is expressed as follows:

$$RR \text{ position correction amount } \Delta PRR=CMRR\times\Delta T+CPRR\times\Delta T=(CMRR+CPRR)\times\Delta T \quad (4)$$

Since (CMRR+CPRR) equals to the total temperature compensation coefficient CRR, the RR position correction amount $\Delta PRR$ is given by:

$$\Delta PRR=CRR\times\Delta T$$

On the other hand, if separate temperature sensing means are used for the plastic lens and the lens holding members, the RR position correction amount $\Delta PRR$ is expressed as follows, where T1 and T2 respectively indicate the temperatures sensed by these temperature sensing means:

$$RR \text{ position correction amount } \Delta PRR=CMRR\times(T1-T0)+CPRR\times(T2-T0)$$

The position correction data PRRT indicative of the position of the RR 104 after the correction can be determined by adding the value of the above-mentioned RR position correction amount $\Delta PRR$ to the representative position data PRR of the RR 104.

Figure 10:
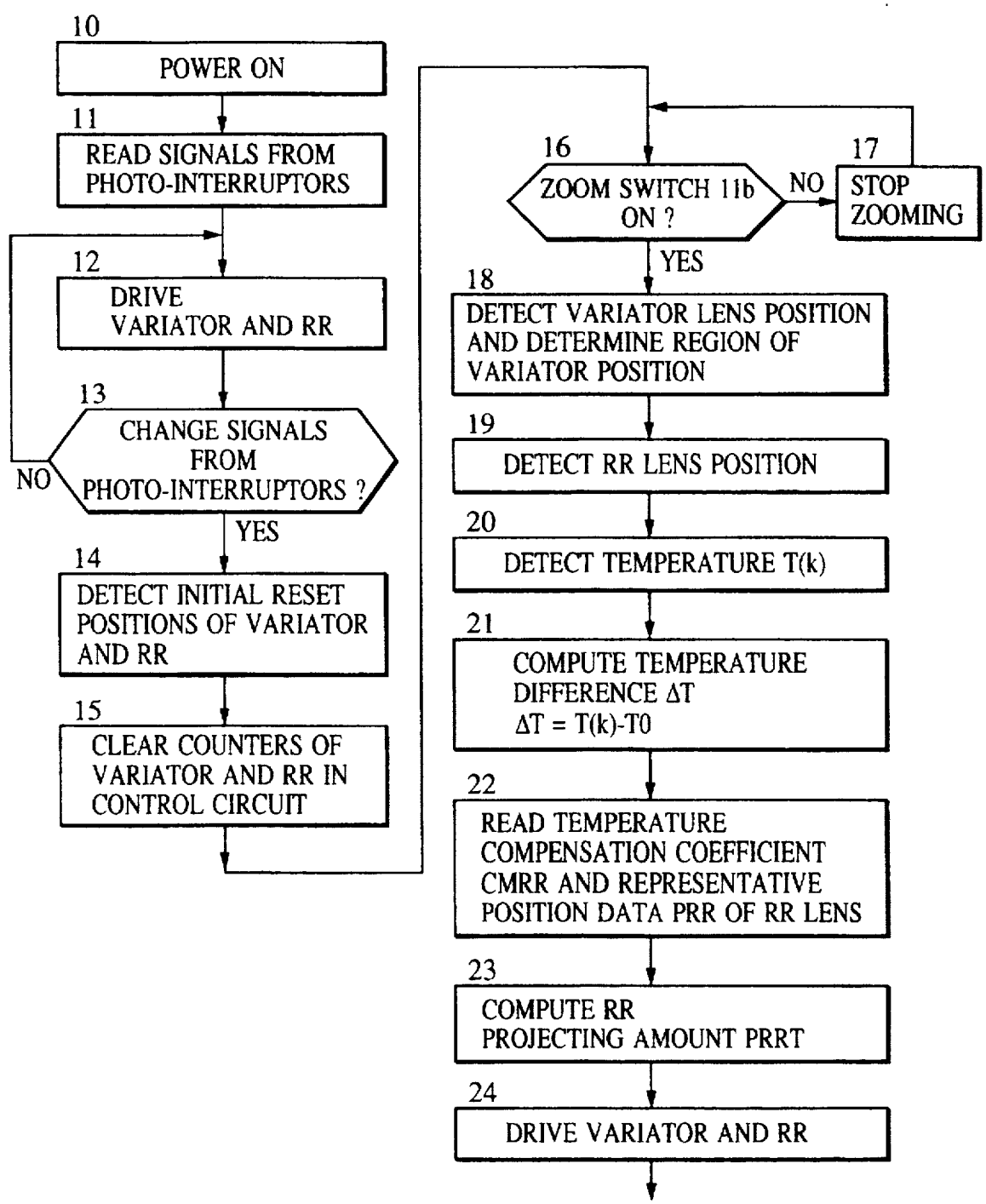
FIG. 10 is a schematic illustration of a critical portion of sixth and eighth embodiments of the optical apparatus in accordance with the present invention.

The operation of this embodiment will be described with reference to the flowchart shown in FIG. 10.

The power supply 25 is turned on in Step 10, and the signals from the photo-interrupters 8a, 10a are read through the detecting circuits 21 and 23 in Step 11. Then, in Step 12, the control circuit 13 performs such a control as to drive the variator 102 and the RR 104 in directions which are determined by the levels of the signals read through the detecting circuits 21, 23. When the signals read through the detecting circuits 21, 23 are "high", the variator 102 and the RR 104 are driven in such a direction as to render the signals "low", and vice versa. Step 13 determines whether or not the levels of signals from the interrupters 8a, 10a have been changed. If no change is confirmed, the control circuit 13 continues the described control, whereas, if a change is detected, the process proceeds to Step 14.

In Step 14, the position of the variator 102 at which the signal level from the interrupter 8a has changed and the position of the RR 104 at which the signal from the interrupter 10a has changed are determined as the initial reset positions of the variator 102 and the RR 104. The variator 102 and the RR 104 are stopped at these positions and, in Step 15, the counters in the control circuit 13 for the variator 102 and the RR 104 are cleared. These counters are adapted to count the number of driving pulses supplied to drive the variator 102 and the RR 104, respectively. The counters thus cleared are therefore ready for counting the number of driving pulses supplied for driving the variator 102 and the RR 104 from their initial reset positions, thus enabling detection of positions of the variator 102 and the RR 104 relative to the initial reset positions.

Step 16 determines whether or not the zoom switch device 11 has been operated. If the zooming switch 11a has been pressed, a zooming towards WIDE end is performed, whereas, if the switch 11b has been pressed, zooming operation is performed towards the TELE end. No zooming operation is performed when neither the zoom switch 11a nor the zoom switch 11b has been pressed.

The following description is made on an assumption that the zooming towards the TELE end has been selected. It is to be understood, however, the routine executed when the zooming towards the WIDE end is the same as that of the zooming in the TEL direction and, therefore, is not described.

In Step 18, the position PV of the variator 102 is detected based on the value of the counter, and a search is conducted to determine the range section PVV in which the variator 102 exists.

Similarly, in Step 19, the representative data PRR of the RR 104 corresponding to the region PVV in which the variator 102 exists is read based on the value of the counter.

In Step 20, the signal from the temperature sensor 12 arranged around the front lens 101 is supplied to the control circuit 13 through the detection circuit 24, whereby the temperature T at the location of the temperature sensor 12 is detected. The temperature T as observed at a moment t seconds after the turning on of the power supply is expressed as T(t). The control circuit 13 of this embodiment is practically a microprocessor, and the detected temperature is picked up periodically at the sampling frequency of the microprocessor. Therefore, the temperature T(t) can be expressed as T(k), where "k" indicates the number of cycles of data pickup operations periodically performed since the moment at which the power was turned on. In this embodiment, what is important is that the data train of the detected temperature is a function of the time, and such data train may be expressed in any desired form provided that it is a function of time.

In Step 21, the detected environmental temperature T(k) is compared with the reference temperature T0, whereby the temperature difference $\Delta T=T(k)-T0$ is determined. Thereafter, the temperature compensation coefficients CPRR and CMRR, as well as the representative position data PRR of the RR 104 are read in Step 22.

Then, the following computation is performed to determine the corrected position data indicative of the amount of correction of the position of RR 104 to be performed, i.e., the amount PRRT of forward projection, in Step 23.

$$PRRT=(CPRR+CMRR) \times \Delta T+PRR$$

The variator 102 and the RR 104 are then driven in accordance with the calculated amount PRRT of forward projection, in Step 24.

Although the zooming operation has been described on an assumption that the auto-focus function is not operative during the zooming, it will be understood that the described temperature compensation can be performed substantially in the same manner even if the auto-focusing operation is performed during the zooming.

The type, number and positions of the temperature sensing means are not exclusive and may be determined suitably taking into account the factors such as the temperature distribution, number of the plastic lenses and costs.

A description will now be given of the fifth embodiment of the optical apparatus in accordance with the present invention. The fifth embodiment employs lens groups substantially the same as those used in the second embodiment excepting that one or more of the lens groups include at least one element lens which is made of a plastic.

A de-focus of the optical system employing a plastic element lens is caused in addition to the de-focus which is caused by a change in the distance between the lens holding members, as a result of a change in the humidity. It is therefore necessary that a compensation is performed in addition to that accomplished by the second embodiment. Thus, the fifth embodiment is intended to effect a humidity compensation for the de-focus caused by a change in the shape and refractive index of the plastic lens, further to the humidity compensation performed by the second embodiment. Thus, the critical portion of the fifth embodiment is substantially the same as that shown in FIG. 7.

The shift of focal plane of the optical system caused by a change in the humidity largely varies according to the factors such as the number of the plastic lenses employed and the shapes of the plastic lenses. In the fifth embodiment, the amount of de-focus caused by plastic lenses per unit humidity is calculated and determined as the plastic lens humidity compensation coefficient CPRR, based on the amount of de-focus caused by the change in the focal length of the plastic lens in response to a change of the humidity from the reference humidity H0.

In this embodiment, the ROM 14 stores the plastic lens humidity compensation coefficient HPRR in addition to the aforementioned humidity compensation coefficient HMRR for lens holding members, and the cam loci in accordance with the change in humidity is corrected based on these coefficients so as to easily perform compensation for the de-focus.

More specifically, a total humidity compensation coefficient DRR, indicative of the amount of shift of the focal plane of the whole optical system per unit humidity, can be calculated and determined as the sum of the plastic lens humidity compensation coefficient HPRR and the aforesaid humidity compensation coefficient HMRR caused by the change in the distance between the lens holding members. It is possible to implement a more accurate humidity compensation control by using this total humidity compensation coefficient.

When the output H from the humidity sensing means shows that the humidity has been changed by $\Delta H$ from the reference humidity H0, the amount $\Delta PRR$ of correction of the RR position is expressed as follows, based on the humidity difference $\Delta H=(H-H0)$ and the values of the humidity compensation coefficients HMRR and HPRR:

$$RR \text{ position correction amount } \Delta PRR=HMRR \times \Delta H+HPRR \times \Delta H=$$

$$(HMRR+HPRR) \times \Delta H \qquad (5)$$

Since (HMRR+HPRR) equals to the total temperature compensation coefficient DRR, the RR position correction amount ΔPRR is given by:

$$\Delta PRR = DRR \times \Delta H$$

The position correction data PRRT indicative of the position of the RR 104 after the correction can be determined by adding the value of the above-mentioned RR position correction amount ΔPRR to the representative position data PRR of the RR 104.

Figure 11:
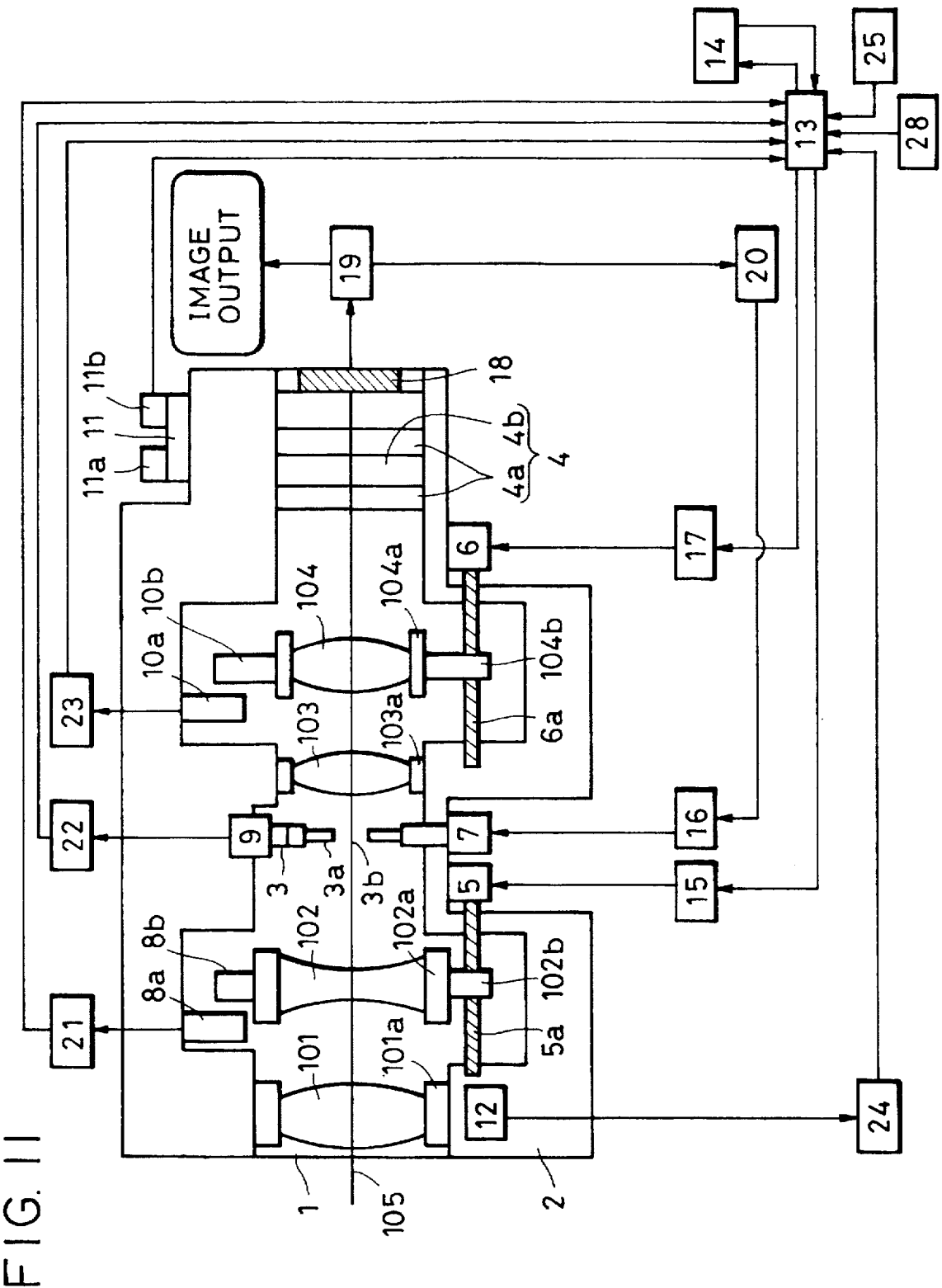
FIG. 11 is a flowchart illustrative of the operation of the sixth embodiment.

FIG. 11 is a schematic illustration of a critical portion of the sixth embodiment of the optical apparatus in accordance with the present invention. The sixth embodiment is similar to the fourth embodiment described before but has a rewritable storage means 28, referred to also as a "second storage means" hereinafter, connected to the control circuit 13. Other portions are substantially the same as those of the fourth embodiment. The rewritable storage means 28 stores temperature compensation coefficients CPRR and CMRR which will be described later.

In each of the lens group employed in this embodiment, at least one element lens is a plastic lens made of a plastic.

In this embodiment, the amounts of the forward projection of the RR 104 towards the object are stored as representative position data PRR in the ROM 14 for each value of the distance to the object positions PV of the variator 102, by using the position PV of the variator 102 as the parameter, within the ranges of movements of the variator 102 and the RR 104 along the optical axis, based on a reference temperature.

The ROM 14 also stores, for each value of the distance to the object, the values of the plastic lens temperature compensation coefficient CPRR and the temperature coefficient CMRR for the lens holding members, with respect to the position PV of the variator 102.

Thus, in this embodiment, the range over which the variator 102 is movable is divided into a plurality of sections of a predetermined length, and the ROM 14 serving as the first storage means stores the values of the representative position data PRR indicative of the position of the RR 104 are stored in the form of numerical value data corresponding to values of the distance to the object, for each of the sections of the range over which the variator 102 moves.

In the meantime, the rewritable storage means 28 serving as the second storage means stores the values of the temperature compensation coefficients CPRR and CMRR.

The conditions stated above are only illustrative. For instance, it is not essential that the range of movement of the variator 102, used as the index of the position data PV of the variator 102, is divided at a constant length. If the range of movement of the variator 102 is divided at an irregular pitch, the representative position data PRR of the RR 104 for each value of the distance to the object may be defined as a function of the position data PV indicative of the position of the variator 102.

The temperature compensation coefficients CPRR and CMRR are calculated based on the amount of de-focus caused by a change in the focal lengths of the plastic lenses and the amount of de-focus caused by a change in the distance between the lenses due to expansion or contraction of the lens holding members holding the lens groups of RFZ 1 caused by a change in the environmental temperature from the reference temperature T0.

The temperature compensation coefficients CPRR and CMRR can be determined based on the coefficients of linear thermal expansion of the materials of the members and the sensitivity of the lenses. Such values of the temperature compensation coefficients, however, may fail to provide appropriate compensation due to reasons such as a variation of the optical performance according to individual lenses, error incurred during assembly, change in the material and so forth. In such a case, the temperature compensation coefficients may cause an excessively large or insufficient compensation, causing a de-focus of the whole optical system.

The sixth embodiment provides a solution to this problem by allowing rewriting of the temperature compensation coefficients CPRR and CMRR which are stored in the rewritable storage means 28.

Thus, in the sixth embodiment, it is possible to rewrite the values of the data indicative of the temperature compensation coefficients CPRR and CMRR stored in the storage means 28, depending on the lot of production and the material used. This permits an easy and accurate compensation without requiring a change in the control program, thus offering great advantages in terms of ease of mass-production and costs of production.

In this embodiment, when a temperature difference $\Delta T = (T-T0)$ from the reference temperature T0 is exhibited by the temperature information data T derived from the temperature sensor 12 through the detecting circuit 24, the representative position data PRR of the RR 104 is corrected in accordance with the temperature compensation coefficients CPRR, CMRR and the temperature difference ΔT, so as to compute the corrected position data PRRT indicative of the position of the RR 104 after the correction, in accordance with the following equation.

$$PRTT = (CPRR + CMRR) \times \Delta T + PRR$$

The above-described computation for determining the amount of correction, however, is only illustrative. Thus, in the present invention, the amount of forward projection of the RR 104 in response to change in temperature may be approximated by any desired type of function such as a quadratic equation, cubic equation, quartic equation, exponential function or a logarithmic function.

The operation of this embodiment is substantially the same as that of the fourth embodiment.

Figure 12:
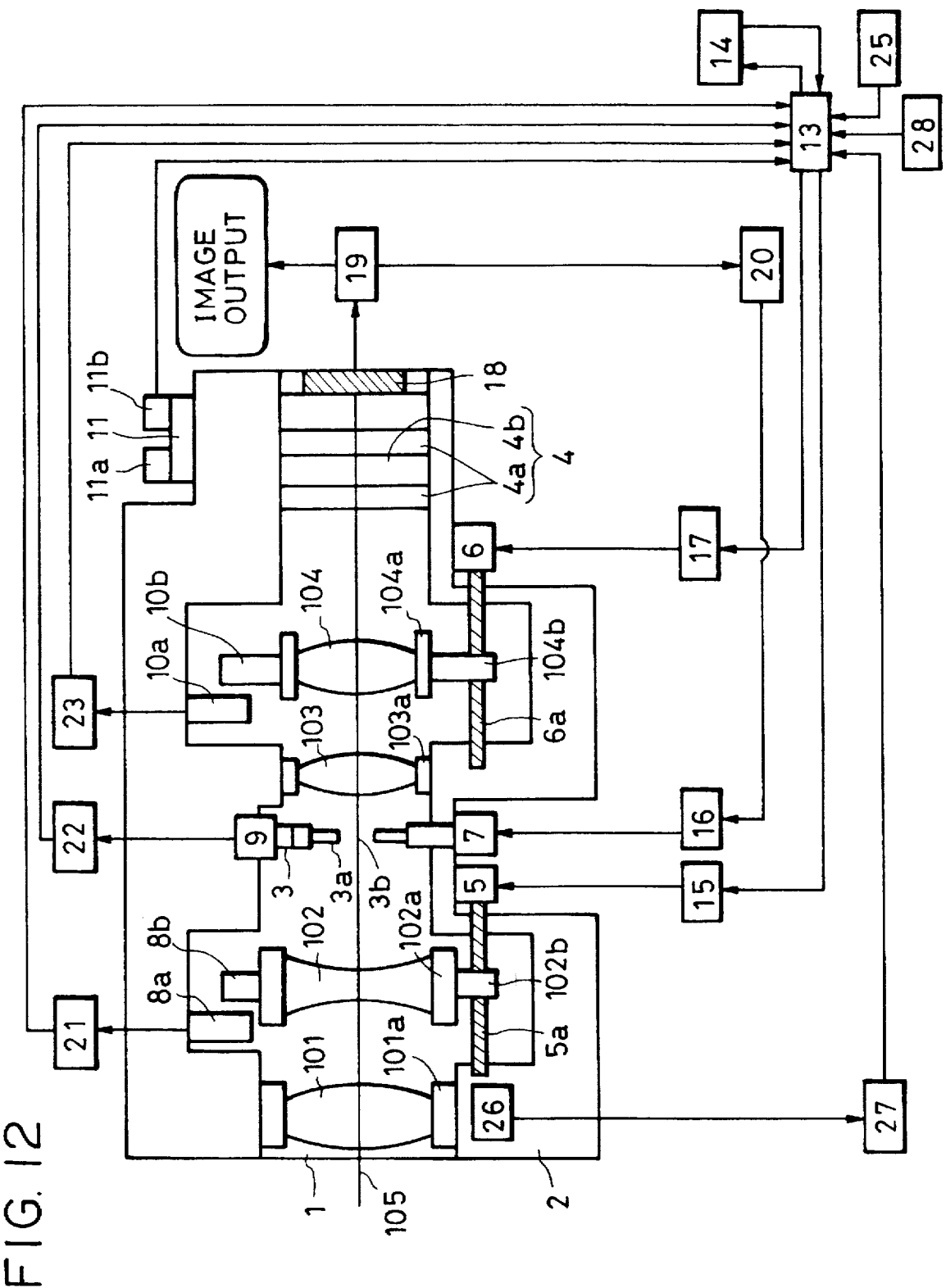
FIG. 12 is a schematic illustration of a critical portion of the seventh and eighth embodiments of the optical apparatus in accordance with the present invention.

FIG. 12 is a schematic illustration of a critical portion of the seventh embodiment of the optical apparatus in accordance with the present invention. The seventh embodiment is similar to the fifth embodiment described before but has a rewritable storage means 28, referred to also as a "second storage means" hereinafter, connected to the control circuit 13. Other portions are substantially the same as those of the fifth embodiment. The rewritable storage means 28 stores humidity compensation coefficients HPRR and HMRR which will be described later. In contrast to the sixth embodiment, which effects a temperature compensation to eliminate the de-focus, the seventh embodiment is intended to perform elimination of the de-focus attributable to a change in humidity.

In each of the lens group employed in this embodiment, at least one element lens is a plastic lens made of a plastic.

The method of correction for eliminating de-focus of the RFZ lens 1 caused by a change in humidity is basically the same as that of the fifth embodiment. Thus, the construction of the seventh embodiment is different from that of the fifth embodiment only in that the rewritable storage means 28 is provided.

A brief description will be given of the effect of humidity in this embodiment. As stated before, each lens group in this embodiment employs at least one plastic lens. A change in the humidity of the environmental atmosphere causes a change in the focal length of each plastic lens due to moisture absorption. At the same time, dimensions of the lens holding members are changed depending on the materials thereof, as a result of the change in humidity, so that the distances between adjacent lenses are changed, resulting in a de-focus of the RFZ lens 1.

Therefore, when a zooming operation is conducted in manual focusing mode under an environment in which the humidity is largely deviated from the reference humidity (reference humidity is set to be 50% in this embodiment), it is impossible to obtain an image of high quality free from de-focus, if the data concerning the amount of forward projection of the RR 104 in relation to the position of the variator 102, determined based on the reference humidity, is relied upon in the zooming operation.

In this embodiment, therefore, the humidity compensation coefficient data HPRR and HMRR are rewritably stored in the rewritable storage means 28 similarly to the case of the sixth embodiment, so that these coefficients may be rewritten according to production lot or according to the materials used, whereby an optimum correction can easily be effected without requiring any change in the control program itself, thus offering great advantage in regard to ease of mass-production and costs of production.

The sixth and seventh embodiments incorporate temperature sensing means and humidity sensing means. It will be understood that the rewritable storage means 28 (second storage means) used in the sixth and seventh embodiment also may be employed in the third embodiment described before, so that a simultaneous compensation may be effected both on de-focus caused by a change in the temperature and de-focus caused by a change in humidity, in the same manner as that conducted in the sixth and seventh embodiments.

A description will now be given of an eighth embodiment. The eighth embodiment is basically the same as the sixth embodiment. Thus, the critical portion of the eighth embodiment is the same as that shown in FIG. 11. The most significant feature of the eighth embodiment resides in that a rewritable storage means 28 is provided to store data to be used for the purpose of correction of the temperature compensation coefficient data.

More specifically, the eighth embodiment has first storage means which is constituted by a ROM 14 and which stores the representative position data PRR, temperature compensation coefficient reference data $CMRR_0$ relating to the structural members and temperature compensation coefficient reference data $CPRR_0$ relating to plastic lenses. The eighth embodiment further has the rewritable storage means (second storage means) which stores coefficient correction data CC.

Thus, the eighth embodiment performs further compensation by effecting a correction of the temperature compensation coefficients by using the correction coefficient stored in the rewritable storage means, so as to achieve optimum temperature compensation depending on factors such as the variation of optical performance of the individual lenses, error incurred in the course of production and the change in the materials, rather than rewriting the temperature compensation coefficients in accordance with these factors.

Thus, in accordance with the eighth embodiment, it is not necessary that the temperature compensation coefficient data themselves are stored in the rewritable storage means 28.

This feature is very advantageous particularly when a large volume of temperature compensation coefficient is employed. For instance, 200 pieces of temperature compensation coefficient data may have to be employed for different focal lengths. From the viewpoints of storage capacity, computing load, time and cost, it is quite inconvenient to store all these data and to rewrite all the stored data.

In this embodiment, therefore, the ROM 14 serving as the first storage means stores the temperature compensation reference coefficients $CPRR_0$ and $CMRR_0$, while the rewritable storage means 28 serving as the second storage means stores the coefficient correction data CC to be used for the purpose of correcting the reference coefficients stored in the ROM 14. For instance, the coefficient correction data may be determined so as to set the temperature compensation coefficients to 75% or 125% of the temperature compensation reference coefficients, for all of the aforesaid 200 pieces of data inclusively. This remarkably reduces the storage capacity, computing load, time and cost, thus offering a great advantage for optical apparatus.

The described operation may be programmed in the control circuit 13. In such a case, the coefficient correction data may be a coefficient or gradient of a first-order equation or may be a certain function. Alternatively, the coefficient correction data can be used as correction data for respective focal lengths.

More specifically, in this embodiment, the amount $\Delta PRR$ of correction of the RR position is determined in accordance with the following equation (6), by using the temperature compensation reference coefficients $CPRR_0$ and $CMRR_0$, as well as the coefficient correction data CC.

$$\Delta PRR = (CPRR_0 + CMRR_0) \times CC \times T \qquad (6)$$

Figure 13:
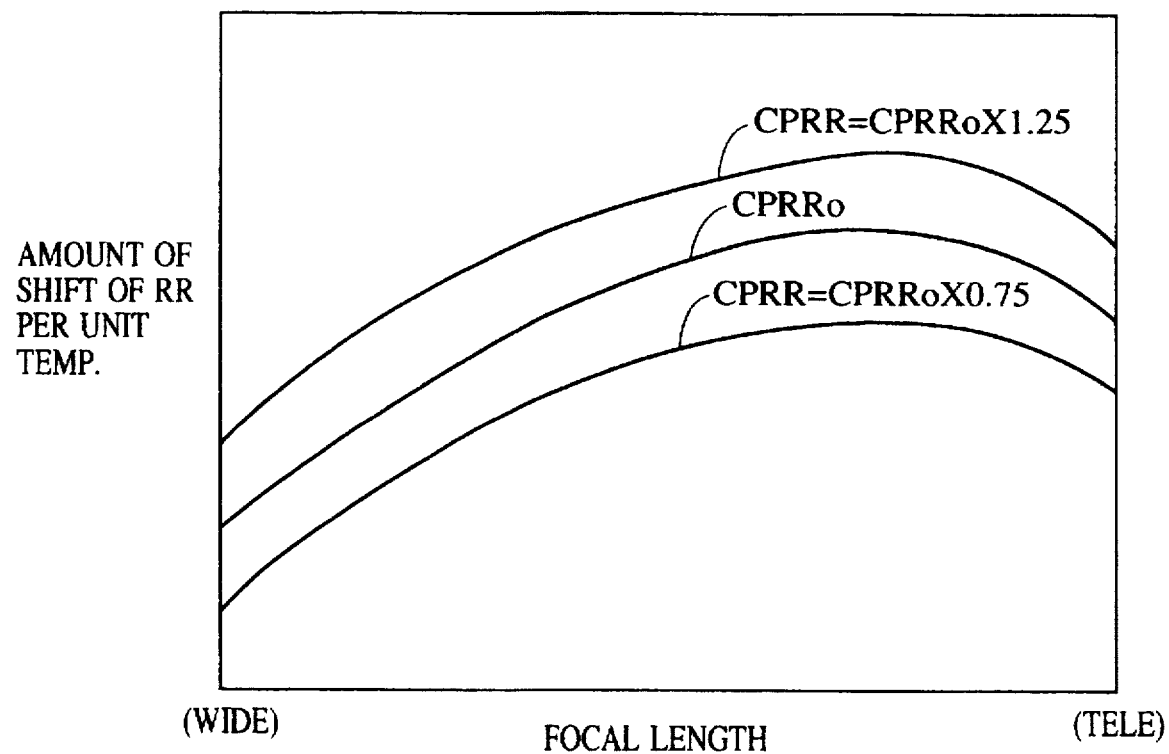
FIG. 13 is an illustration of a temperature compensation coefficient used in the ninth embodiment.

FIG. 13 shows the temperature compensation coefficient data CPRR, i.e., the amount of de-focus per unit temperature. Thus, the values shown in this Figure correspond to the amount of compensation to be effected, i.e., the amount of movement of the RR necessary to effect the compensation. The lowermost curve and the uppermost curve show, respectively, the corrected temperature compensation coefficients CPRR as obtained by correcting the temperature compensation reference coefficient CPRR0 with the coefficient correction data CC of CC=0.75 and CC=1.25.

A description will now be given of the ninth embodiment of the present invention. This embodiment is substantially the same as the seventh embodiment and, hence, has a critical portion which is the same as that shown in FIG. 12. The most important feature of this embodiment is that a rewritable storage means 28, referred to also as second storage means, is used to rewritably store coefficient compensation coefficient CC which is necessary for the purpose of correcting the humidity compensation coefficient data.

Thus, the ninth embodiment performs an appropriate humidity compensation by using the coefficient correction data which is stored in the rewritable storage means 28 which is used for correcting the humidity compensation reference coefficients, rather than by rewriting all the humidity compensation coefficients depending on the factors such as the difference of optical performance between individual lenses, production error and materials.

In this embodiment, therefore, it is not necessary to store the voluminous humidity compensation coefficient data in the rewritable storage means 28.

The features of the ninth embodiment are substantially the same as that of the eighth embodiment, except that the temperature sensing means, temperature detecting circuit and the temperature compensation reference coefficient, e.g., $CPRR_0$, of the eighth embodiment are substituted by humidity sensing means, humidity detecting circuit and humidity compensation reference coefficient, e.g., $HPRR_0$.

The ninth embodiment also is highly effective particularly when large volumes of humidity compensation coefficient data are to be used. The humidity compensation reference coefficients themselves are stored in the ROM 14, and only the coefficient correction data CC to be used for the correction of the compensation coefficients are stored in the rewritable storage means 28. For instance, the coefficient correction data CC may be determined to set the humidity compensation coefficient values to 75% or 125% of the reference coefficient values for all of, for example, the 200 pieces of data. Consequently, the ninth embodiment significantly reduces the storage capacity, as well as computation load and computing time, thus offering a great advantage for the optical apparatuses of the kind described.

A description will now be given of the tenth embodiment of the optical apparatus in accordance with the present invention. The critical portion of the tenth embodiment is substantially the same as that of the fourth embodiment described before with reference to FIG. 1. Thus, in each of the lens groups, at least one element lens is a plastic lens. In this embodiment, the optical apparatus is adjusted to automatically eliminate any de-focus, based on the detected temperature of the optical apparatus in the state of use, when a uniform temperature has been established inside the optical apparatus.

A temperature compensating operation of this embodiment is as follows.

In this embodiment, the amount of shift of the focal plane, i.e., de-focus, per unit temperature has been stored beforehand in terms of a total temperature compensation coefficient CRR. This amount of de-focus has been determined and stored based on the results of computation or actual measurement of both the amount of shift of the focal plane caused by a change in the focal length of the plastic lens due to a change in the temperature and the amount of shift of the focal plane caused by a change in the distance between the lenses due to the change in the temperature of a lens holding member.

Thus, the amount $\Delta PRR$ of correction of the RR can easily be derived from the following equation (7), based on the difference $\Delta T$ between the detected temperature T and the predetermined reference temperature T0.

Amount $\Delta PRR$ of correction of $RR$ position=$\Delta T \times CRR$ (7)

It is possible to effect a good temperature compensation control adapting to a change in the environment (temperature), by adding or subtracting the RR position correction amount $\Delta PRR$ to or from the representative position data PRR indicative of the representative positions of the RR lens corresponding to different values of the distance to the object (the position of the variator or the focal length is used as a parameter), using the focal length at the reference temperature as the parameter.

Figure 17:
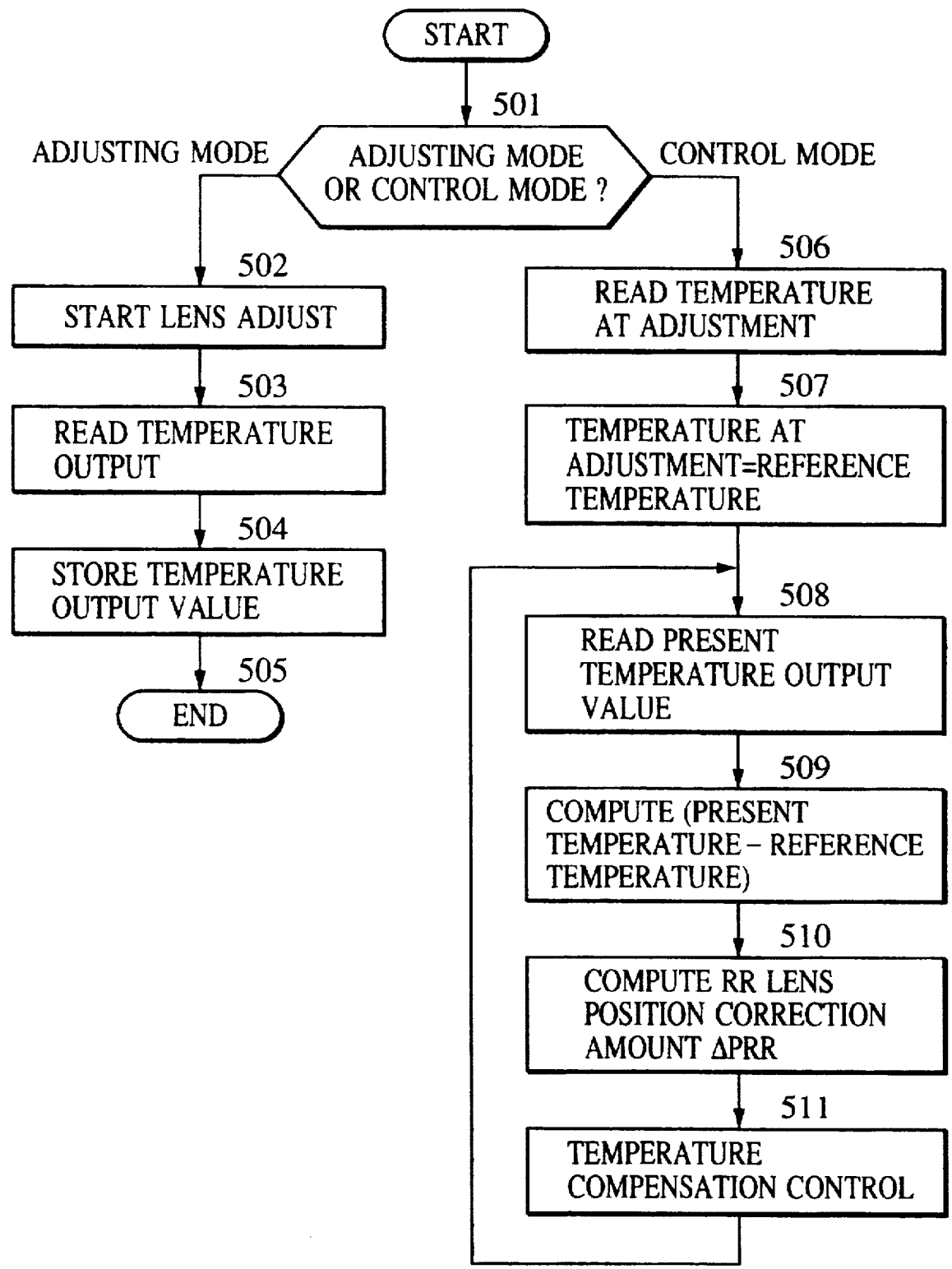
FIG. 17 is a flowchart illustrative of the operation of the tenth embodiment.

The operation of the tenth embodiment will be described with reference to a flowchart shown in FIG. 17. Step 501 determines whether or not the present mode is an adjusting mode or a control mode. If the present mode is the adjusting mode, the process advances to Step 502 in which a predetermined lens adjustment is performed and, in Step 503, the output T0 of the temperature sensor is read. Step 504 stores the read value T0. The adjustment is then completed in Step 505.

However, if the determination in Step 501 has proved that the present mode is the control mode, the process skips to Step 506 in which the temperature output T0 at the time of the adjustment is read and, in Step 507, the temperature T0 at the time of the adjustment is set as the reference temperature to be used as the reference for the temperature compensation. The present temperature output T is read in Step 508 and, in Step 509, the difference $\Delta T=T-T0$, between the present temperature output value T and the reference temperature T0, is computed. Then, in Step 510, the amount $\Delta PRR$ of correction of the RR position is computed in accordance with the equation (7) and, in Step 511, the RR 104 is moved to effect the temperature compensation. In the control mode, the process then returns to Step 508 to continuously monitor the temperature and the temperature compensation is performed each time a change in the temperature is detected.

In this embodiment, it is preferred that the temperature at the time of the adjustment is the same as the predetermined reference temperature.

It will also be clear that the adjustment is conducted under an environmental condition in which the optical apparatus is used most frequently.

A certain temperature distribution is established when a predetermined time has lapsed from the moment at which the power is turned on.

Such a temperature distribution tends to cause a change in the loci of the stored data, thus hampering the adjustment to be conducted in accordance with the stored data, resulting in an inaccurate cam tracing after the adjustment.

This embodiment, therefore, is intended to provide an optical apparatus which is capable of performing an accurate cam tracing operation, by conducting the adjustment of the lenses and the cam loci while a uniform temperature has been developed in the lens barrel, i.e., when there is no temperature distribution inside the lens barrel.

The above-described problem is serious particularly when the optical system employs an element which causes a large shift of the focal position in response to a change in temperature, such as a plastic lens. The change in the temperature also causes an expansion or contraction of a member holding the lenses, so as to change the distance between the lenses, which also leads to a shift of the focal plane.

Figure 14:
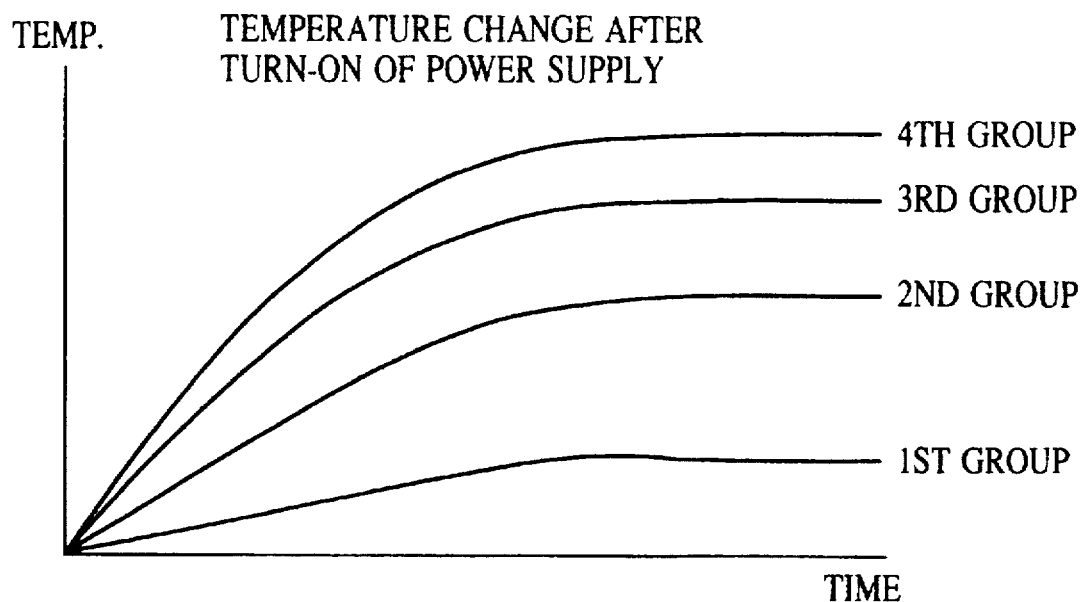
FIG. 14 is an illustration of the changes of temperatures of the lens group exhibited after a power supply is turned on in RFZ 1.

FIG. 14 shows the changes of temperatures of the respective lens groups in relation to lapse of time from the moment at which the power is turned on. Although all the lens groups exhibit the same temperature at the moment at which the power is turned on, temperature differences appear between the lens groups in accordance with the time. For instance, it is possible that a temperature difference of about 20° C. is developed between the first lens group and the fourth lens group when 1 hour has lapsed from the moment at which the power is turned on. Obviously, however, the temperature distribution varies according to factors such as the construction of the optical apparatus, layout of the lenses inside the optical apparatus, and whether or not an actuator is used.

Figure 15:
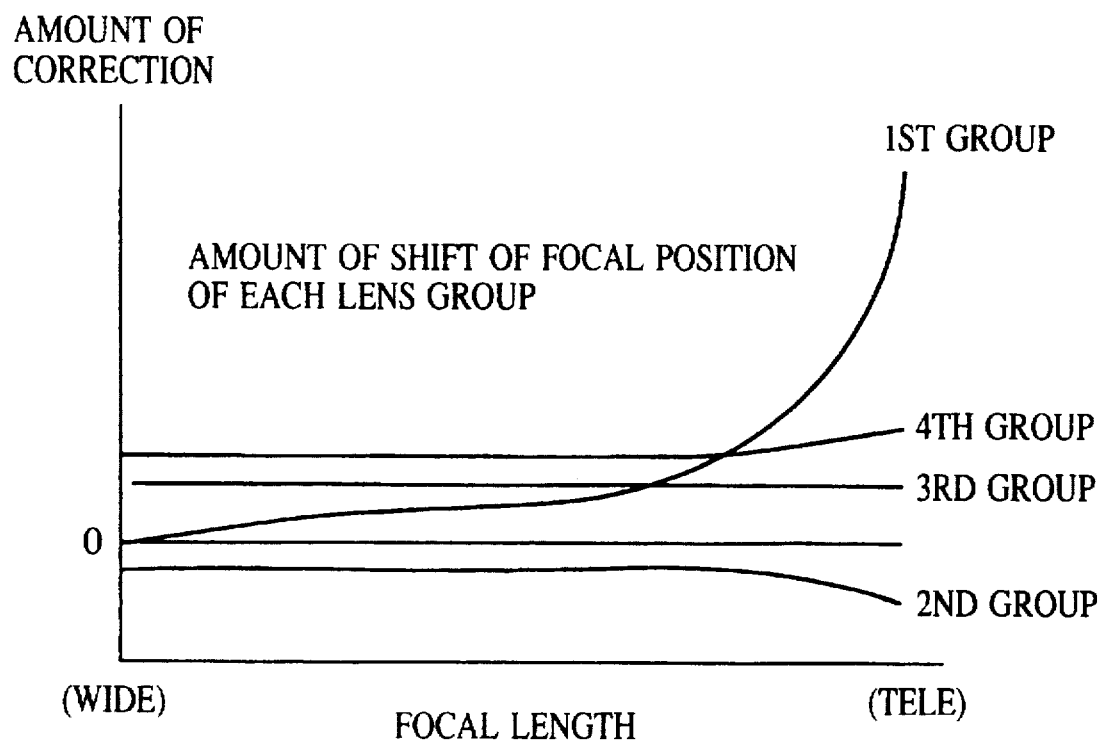
FIG. 15 is an illustration of amounts of movements of the focal positions achieved by the lens groups.

FIG. 15 shows the manners in which the focal position is shifted by the temperature distribution over the lens groups when a certain time has lapsed after the power is turned on. More specifically, this Figure shows amounts of focal positions of the respective lens groups, with the axis of abscissa indicating the focal length of the RFZ lens 1 and the axis of ordinate representing the amounts of shift of the focal positions which are the same as the amounts of correction of the focal positions to be effected. Thus, the sum of these amounts corresponds to the amount of shift of the focal position of the whole lens system.

Figure 16:
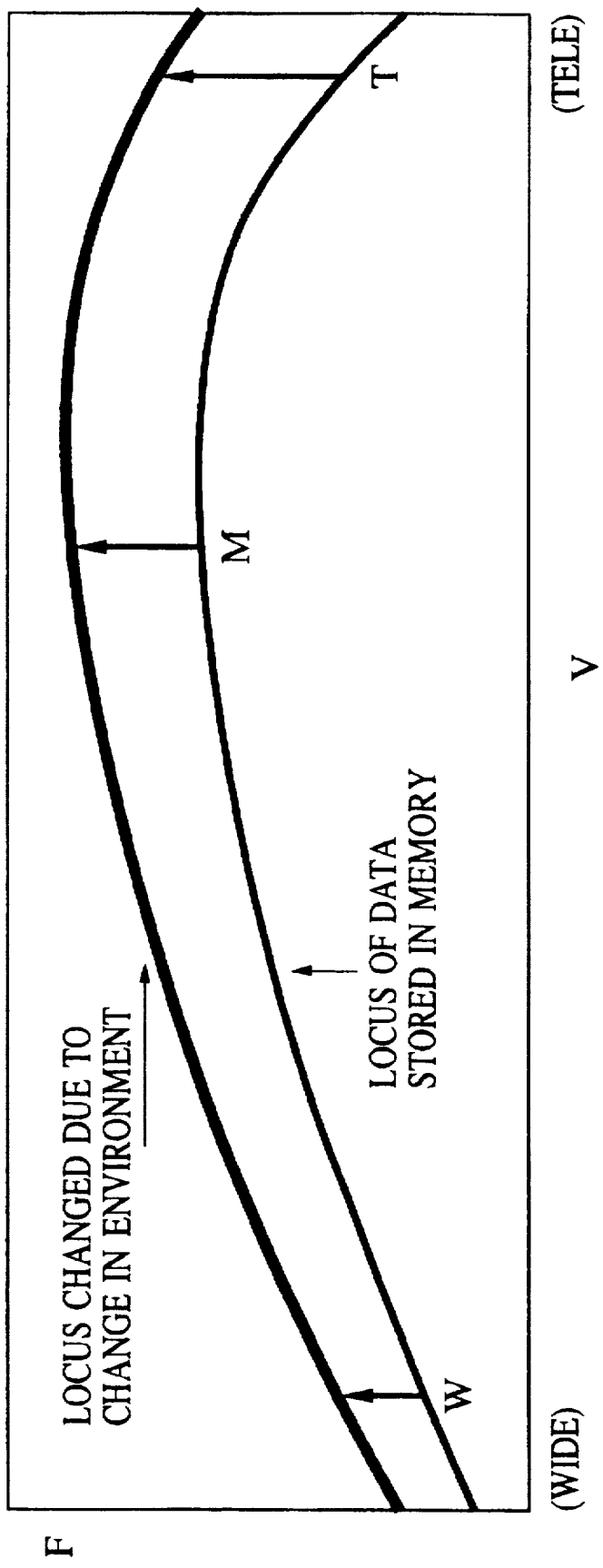
FIG. 16 is an illustration of a change in the cam locus in a tenth embodiment and a cam locus changed by a change in temperature.

FIG. 16 shows the cam locus as obtained at a moment immediately after the power is turned on, i.e., when there is no temperature distribution, and the cam locus for correcting a de-focus, i.e., shift of the focal position, of the whole lens system. It will be seen from this Figure that the cam locus largely changes depending on the temperature distribution.

The change of the cam locus is significant particularly when the lens system includes an element which exhibits a large change in the focal length, such as a plastic lens.

Usually, adjustment of the optical system is conducted in accordance with the stored cam locus. An adjustment conducted under a certain temperature distribution may impede accurate cam tracing operation because the temperature distribution in the state of use of the optical apparatus may be extinguished or significantly changed from that under which the adjustment has been conducted.

In addition, a temperature compensating operation may fail, as the adjustment has not been effected based on the reference cam locus.

This embodiment, therefore, proposes to conduct the adjustment when a uniform temperature has been developed in the lens system, thereby ensuring high degrees of accuracy of the cam tracing and temperature compensating operations.

The proposal of this embodiment can apply to any optical apparatus which requires an adjustment, no matter whether or not the optical apparatus has any temperature sensing means and temperature information means.

This embodiment can advantageously be applied not only to the adjustment of the cam locus but also to any type of adjustment required in optical apparatuses, and is effective particularly when the optical apparatus has an element which is likely to be influenced by a change in temperature.

A description will now be given of the eleventh embodiment of the optical apparatus in accordance with the present invention. The critical portion of the eleventh embodiment is substantially the same as that of the fifth embodiment described before with reference to FIG. 7. Thus, in each of the lens groups, at least one element lens is a plastic lens. In this embodiment, the optical apparatus is adjusted to automatically eliminate any de-focus, based on the detected humidity of the optical apparatus in the state of use, when a uniform humidity has been established inside the optical apparatus. Thus, the eleventh embodiment is intended to enable an accurate cam tracing operation, by conducting the adjustment of the lenses and the adjustment of the cam loci under the condition in which uniform humidity has been developed inside the lens system, i.e., when there is no humidity distribution inside the lens system.

The eleventh embodiment is to deal with inferior adjustment attributable to the change in environment (humidity) and, therefore, the intention is similar to that of the tenth embodiment.

The eleventh embodiment is basically the same as the tenth embodiment, except that the temperature sensor 12, the temperature detecting circuit 24 and the total temperature compensation coefficient CRR of the tenth embodiment are replaced with a humidity sensor 26, a humidity detecting circuit 27 and a total humidity compensation coefficient DRR, respectively.

In this embodiment, the amount of shift of the focal plane, i.e., de-focus, per unit humidity has been stored beforehand in terms of a total humidity compensation coefficient DRR. This amount of de-focus has been determined based on the results of computation or actual measurement of both the amount of shift of the focal plane caused by a change in the focal length of the plastic lens due to a change in the humidity and the amount of shift of the focal plane caused by a change in the distance between the lenses due to the change in the humidity of a lens holding member, and the amount thus determined is stored in the storage means 14.

Thus, the amount ΔPRR of correction of the RR can easily be derived from the following equation (8), based on the difference ΔH between the detected humidity H and the predetermined reference humidity H0.

Amount ΔPRR of correction of RR position=ΔH×DRR  (8)

It is possible to effect a good humidity compensation control adapting to a change in the humidity environment, by adding or subtracting the RR position correction amount ΔPRR to or from the representative position data PRR indicative of the representative positions of the RR lens corresponding to different values of the distance to the object (the position of the variator or the focal length is used as a parameter), using the focal length at the reference humidity as the parameter.

Figure 18:
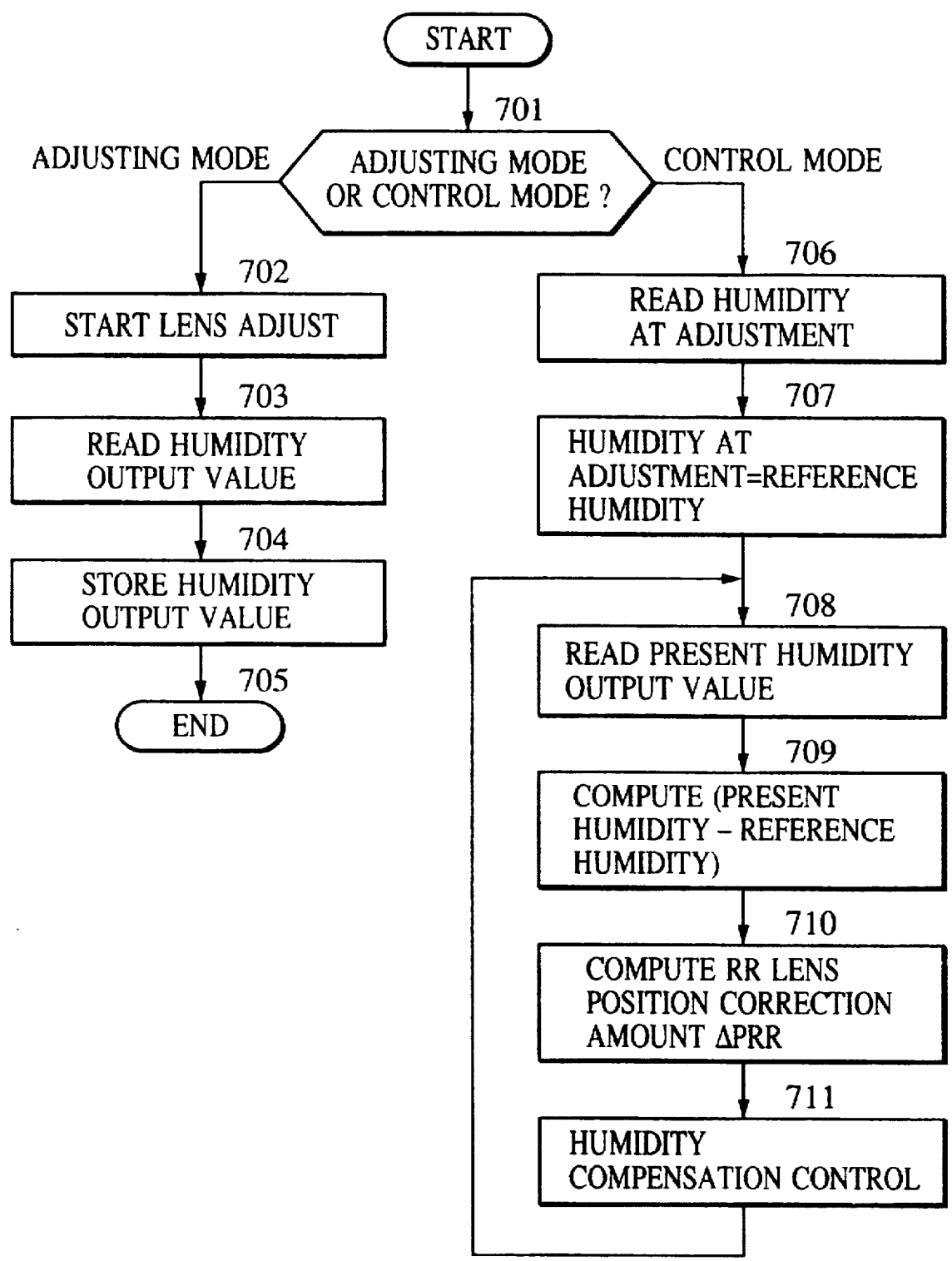
FIG. 18 is a flowchart illustrative of the operation of the eleventh embodiment.

The operation of the tenth embodiment will be described with reference to a flowchart shown in FIG. 18. Step 701 determines whether or not the present mode is an adjusting mode or a control mode. If the present mode is the adjusting mode, the process advances to Step 702 in which a predetermined lens adjustment is performed and, in Step 703, the output H0 of the humidity sensor is read. Step 704 stores the read value H0. The adjustment is then completed in Step 705.

However, if the determination in Step 701 has proved that the present mode is the control mode, the process skips to Step 706 in which the humidity output H0 at the time of the adjustment is read and, in Step 707, the humidity output H0 at the time of the adjustment is set as the reference humidity to be used as the reference for the humidity compensation. The present humidity output H is read in Step 708 and, in Step 709, the difference ΔH=H−H0, between the present humidity output value H and the reference humidity H0, is computed. Then, in Step 710, the amount ΔPRR of correction of the RR position is computed in accordance with the equation (8) and, in Step 711, the RR 104 is moved to effect the humidity compensation. In the control mode, the process then returns to Step 708 to continuously monitor the humidity and the humidity compensation is performed each time a change in the humidity is detected.

In this embodiment, it is preferred that the humidity at the time of the adjustment is the same as the predetermined reference humidity.

It will also be clear that the adjustment is conducted under an environmental condition in which the optical apparatus is used most frequently.

The proposal of this embodiment can apply to any optical apparatus which requires an adjustment, no matter whether or not the optical apparatus has any humidity sensing means and humidity information means.

A description will now be given of the twelfth embodiment of the optical apparatus in accordance with the present invention. The critical portion of the twelfth embodiment is substantially the same as that of the third embodiment described before with reference to FIG. 8. In this embodiment, the optical apparatus is adjusted to automatically eliminate any de-focus, based on the detected temperature and humidity of the optical apparatus in the state of use, when a uniform temperature and humidity have been established inside the optical apparatus. Thus, the twelfth embodiment is intended to enable an accurate cam tracing operation, by conducting the adjustment of the lenses and the adjustment of the cam loci under the condition in which uniform temperature and humidity have been developed inside the lens system, i.e., when there is no temperature distribution and humidity distribution inside the lens system.

The twelfth embodiment is to deal with inferior adjustment attributable to the change in environment (temperature and humidity) and, therefore, the intention is similar to those of the tenth and eleventh embodiments.

Thus, the amount ΔPRR of correction of the RR can easily be derived from the following equation (9), based on the difference ΔT between the detected temperature T and the reference temperature T0 and the difference ΔH between the detected humidity H and the predetermined reference humidity H0.

Amount ΔPRR of correction of RR position=ΔT×CRR+ΔH×DRR(9)

It is possible to effect a good temperature compensation control and a good humidity compensation control adapting to a changes in the temperature and the humidity of the environment, by adding or subtracting the RR position correction amount ΔPRR to or from the representative position data PRR indicative of the representative positions of the RR lens corresponding to different values of the distance to the object (the position of the variator or the focal length is used as a parameter), using the focal lengths at the reference temperature and the reference humidity as the parameter.

Figure 19:
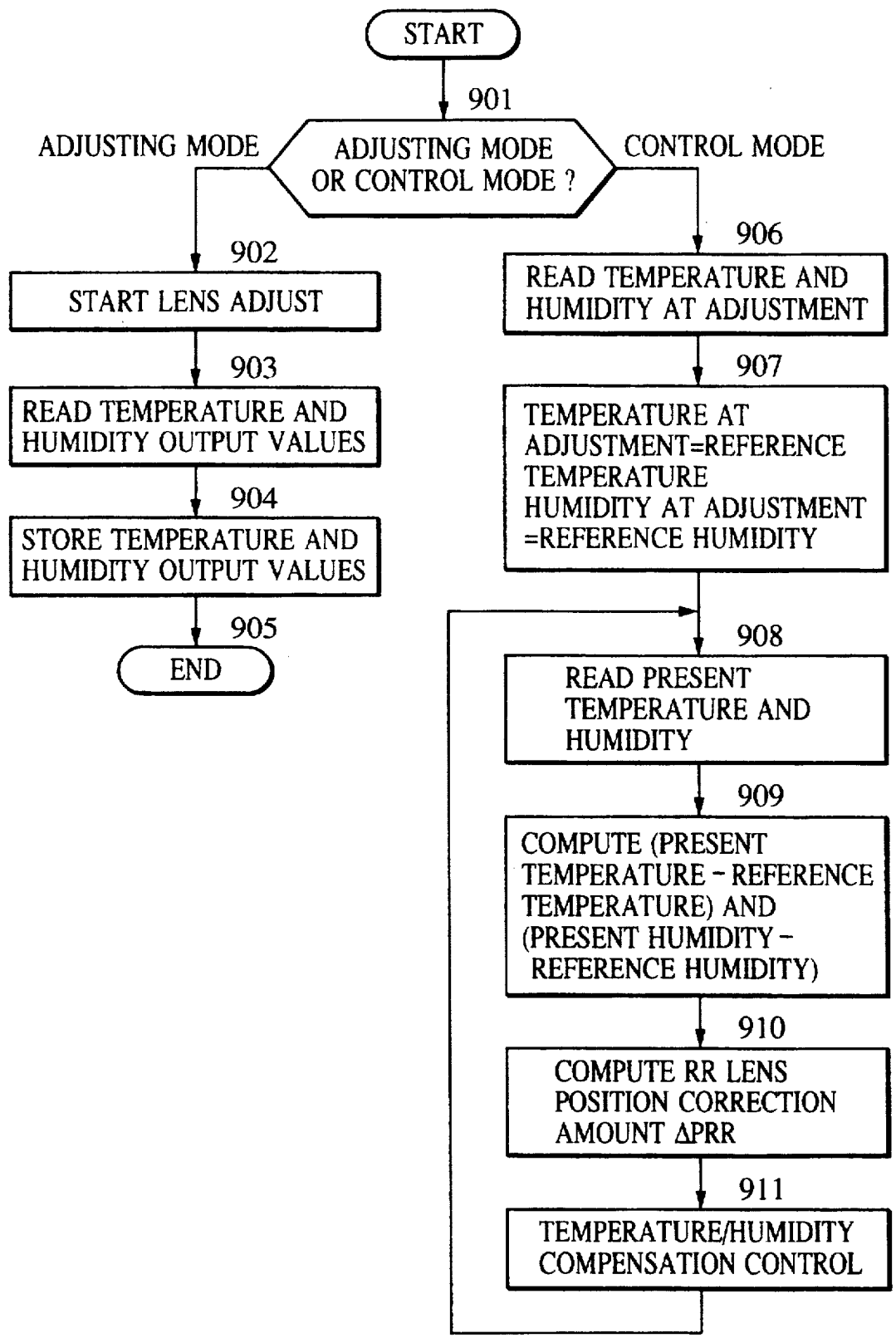
FIG. 19 is a flowchart illustrative of the operation of a twelfth embodiment.

The operation of the twelfth embodiment will be described with reference to a flowchart shown in FIG. 19. Step 901 determines whether or not the present mode is an adjusting mode or a control mode. If the present mode is the adjusting mode, the process advances to Step 902 in which a predetermined lens adjustment is performed and, in Step 903, the output T0 of the temperature sensor and the output H0 of the humidity sensor are read. Step 904 stores the read values T0 and H0. The adjustment is then completed in Step 905.

However, if the determination in Step 901 has proved that the present mode is the control mode, the process skips to Step 906 in which the temperature output T0 and the humidity output H0 at the time of the adjustment are read and, in Step 907, the temperature output T0 and the humidity output H0 at the time of the adjustment are set as the reference temperature and reference humidity to be used as the references for the temperature and humidity compensation. The present temperature output T and the present humidity output H are read in Step 908 and, in Step 909, the difference ΔT=T−T0 between the present temperature T and the reference temperature T0, as well as the difference ΔH=H−H0, between the present humidity output value H and the reference humidity H0, is computed. Then, in Step 910, the amount ΔPRR of correction of the RR position is computed in accordance with the equation (9) and, in Step 911, the RR 104 is moved to effect the environment compensation. In the control mode, the process then returns to Step 908 to continuously monitor the temperature and the humidity and the environment compensation is performed each time a change in the temperature or in the humidity is detected.

It will be clear that the adjustment is conducted under an environmental condition in which the optical apparatus is used most frequently.

The proposal of this embodiment can apply to any optical apparatus which requires an adjustment, no matter whether or not the optical apparatus has any sensing means and information means for sensing temperature and humidity and detecting information concerning temperature and humidity.

Figure 20:
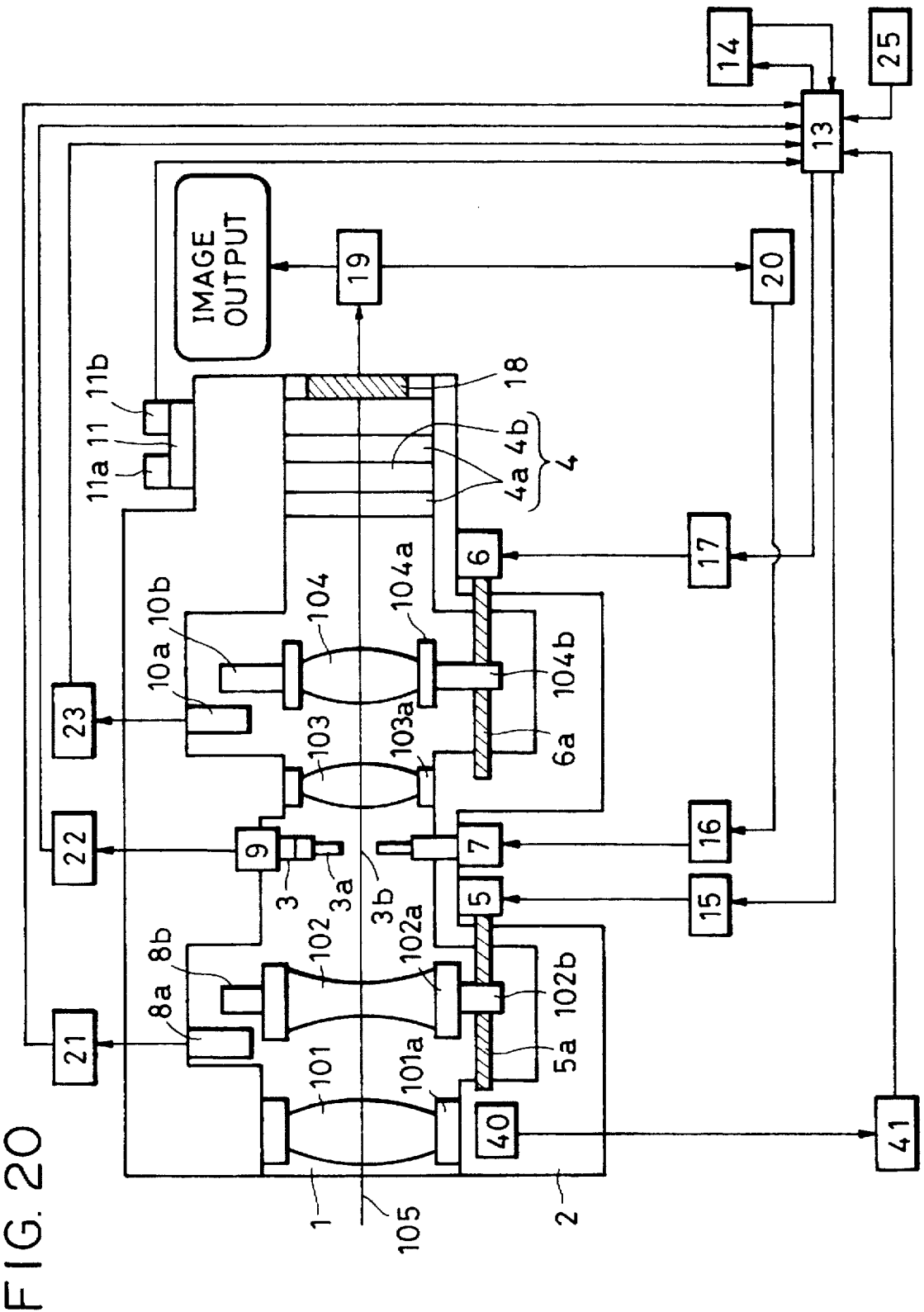
FIG. 20 is a schematic illustration of a thirteenth embodiment of the optical apparatus in accordance with the present invention.

FIG. 20 schematically shows a critical portion of the thirteenth embodiment of the present invention. Detailed description will be omitted in regard to portions which are the same as those of the tenth and eleventh embodiments. In this Figure, numeral 40 denotes an environment sensing means (environment sensor) for detecting the state of the environment. The environment sensor may be a temperature sensor or a humidity sensor. Numeral 41 designates a detecting circuit for detecting the output from the environment sensor 40.

The state of the environment such as temperature or humidity is as close as possible to that under the state of actual use of the optical apparatus.

The thirteenth embodiment is to deal with inferior adjustment attributable to the change in environment and, therefore, the intention is similar to those of the tenth and eleventh embodiments.

The temperature and the humidity at which the adjustment in the tenth and eleventh embodiments are performed may be determined based on certain absolute values. It is, however, clear that the error which may be incurred in the course of computation will be minimized when the temperature and humidity approximate as much as possible the temperature and the humidity in the state of actual use of the optical apparatus.

This embodiment can apply to any optical apparatus which requires an adjustment, no matter whether or not the optical apparatus has any environment sensing means and environment information means.

As will be understood from the foregoing description, the present invention provides an optical apparatus having an optical system (image pick-up lenses) including a movable lens group, wherein, in the event of a change in the environment of the optical apparatus, e.g., a change in temperature or humidity, the locus of movement of the movable lens group is optimally changed and set in accordance with the change in the environment, so as to compensate for any shift of the focal position of the optical system attributable to the change in the environment, thus ensuring high optical performance of the optical apparatus.

Furthermore, even when the environment of the optical apparatus requiring an adjustment has been changed, or even when the optical apparatus is subtle to a change in the environment, the present invention ensures a good in-focus state of the optical system without any de-focus or blur of image.

What is claimed is:

1. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism;

storage means for storing control information used for driving said movable lens; and temperature sensing means for detecting temperature information concerning the temperature around a structural member of said optical system other than said plurality of lenses, wherein said control information includes representative position data concerning the position of said movable lens at a predetermined reference temperature and first temperature compensation coefficient data determined based on data concerning a shift of said focal plane due to a change in the temperature around said structural member, and wherein said control circuit computes, based on said control information and said temperature information, corrected position data indicative of the amount of driving of said movable lens necessary to compensate for the shift of said focal plane due to change in the temperature around said structural member, and controls said lens driving mechanism in accordance with said corrected position data so as to compensate for the shift of the focal plane caused by the change in the temperature.

2. An optical apparatus according to claim 1, wherein said structural member is a lens holding member which holds at least one of said plurality of lenses.

3. An optical apparatus according to claim 1, wherein said optical system is a rear-focus-type zoom lens.

4. An optical apparatus according to claim 1, wherein said first temperature compensation coefficient data is determined as a function of the position of said movable lens which has a magnification changing function.

5. An optical apparatus according to claim 4, wherein said corrected position data is determined by adding said representative position data indicative of the position of said movable lens at the reference temperature to the product of the difference of the temperature detected by said temperature sensing means from said reference temperature and said first temperature compensation coefficient data.

6. An optical apparatus according to claim 1, wherein at least one of said plurality of lenses includes a plastic element lens.

7. An optical apparatus according to claim 6, wherein said control information includes second temperature compensation coefficient data determined based on data concerning the amount of shift of the focal plane due to a change in the temperature around said plastic element lens, and said corrected position data is computed by using both said first temperature compensation coefficient data and said second temperature compensation coefficient data.

8. An optical apparatus according to claim 7, wherein said second temperature compensation coefficient data is determined as a function of the position of said movable lens.

9. An optical apparatus according to claim 7, wherein said corrected position data is determined by adding said representative position data indicative of the position of said movable lens at the reference temperature to the product of the difference of the temperature detected by said temperature sensing means from said reference temperature and the sum of said first temperature compensation coefficient data and said second temperature compensation coefficient data.

10. An optical apparatus according to claim 7, wherein said control circuit performs the compensation for the shift of said focal plane of said optical system due to the change in temperature, even when said control circuit is not controlling said lens driving mechanism.

11. An optical apparatus according to claim 1, wherein said temperature sensing means includes at least one sensor incorporating a temperature-sensitive resistor or a thermistor.

12. An optical apparatus according to claim 1, wherein said storage means includes a first storage circuit storing said representative position data and a rewritable second storage circuit storing said first temperature compensation coefficient data.

13. An optical apparatus according to claim 7, wherein said storage means includes a first storage circuit storing said representative position data and a rewritable second storage circuit storing said second temperature compensation coefficient data.

14. An optical apparatus according to claim 12, wherein said first temperature compensation coefficient data includes a first-order coefficient with respect to the temperature.

15. An optical apparatus according to claim 13, wherein said second temperature compensation coefficient data includes a first-order coefficient with respect to the temperature.

16. An optical apparatus according to claim 12, wherein said first temperature compensation coefficient data includes a coefficient which is substantially linear with respect to the temperature.

17. An optical apparatus according to claim 13, wherein said second temperature compensation coefficient data includes a coefficient which is substantially linear with respect to the temperature.

18. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism;

storage means for storing control information used for driving said movable lens; and humidity sensing means for detecting humidity information concerning the humidity around a structural member of said optical system other than said plurality of lenses, wherein said control information includes representative position data concerning the position of said movable lens at a predetermined reference humidity and first humidity compensation coefficient data determined based on data concerning a shift of the focal plane due to a change in the humidity around said structural member, and wherein said control circuit computes, based on said control information and said humidity information, corrected position data indicative of the amount of driving of said movable lens necessary to compensate for the shift of said focal plane due to change in the humidity around said structural member, and controls said lens driving mechanism in accordance with said corrected position data so as to compensate for the shift of the focal plane caused by the change in the humidity.

19. An optical apparatus according to claim 18, wherein said structural member is a lens holding member which holds at least one of said plurality of lenses.

20. An optical apparatus according to claim 18, wherein said optical system is a rear-focus-type zoom lens.

21. An optical apparatus according to claim 18, wherein said first humidity compensation coefficient data is determined as a function of the position of said movable lens which has a magnification changing function.

22. An optical apparatus according to claim 21, wherein said corrected position data is determined by adding said representative position data indicative of the position of said movable lens at the reference humidity to the product of the difference of the humidity detected by said humidity sensing means from said reference humidity and said first humidity compensation coefficient data.

23. An optical apparatus according to claim 18, wherein at least one of said plurality of lenses includes a plastic element lens.

24. An optical apparatus according to claim 23, wherein said control information includes second humidity compensation coefficient data determined based on data concerning the amount of shift of the focal plane due to a change in the humidity around said plastic element lens, and said corrected position data is computed by using both said first humidity compensation coefficient data and said second humidity compensation coefficient data.

25. An optical apparatus according to claim 24, wherein said second humidity compensation coefficient data is determined as a function of the position of said movable lens.

26. An optical apparatus according to claim 25, wherein said corrected position data is determined by adding said representative position data indicative of the position of said movable lens at the reference humidity to the product of the difference of the humidity detected by said humidity sensing means from said reference humidity and the sum of said first humidity compensation coefficient data and said second humidity compensation coefficient data.

27. An optical apparatus according to claim 24, wherein said control circuit performs the compensation for the shift of said focal plane of said optical system due to the change in humidity, even when said control circuit is not controlling said lens driving mechanism.

28. An optical apparatus according to claim 18, wherein said humidity sensing means includes at least one electrostatic capacitance type sensor.

29. An optical apparatus according to claim 18, wherein said storage means includes a first storage circuit storing said representative position data and a rewritable second storage circuit storing said first humidity compensation coefficient data.

30. An optical apparatus according to claim 24, wherein said storage means includes a first storage circuit storing said representative position data and a rewritable second storage circuit storing said second humidity compensation coefficient data.

31. An optical apparatus according to claim 29, wherein said first humidity compensation coefficient data includes a first-order coefficient with respect to the humidity.

32. An optical apparatus according to claim 30, wherein said second humidity compensation coefficient data includes a first-order coefficient with respect to the humidity.

33. An optical apparatus according to claim 29, wherein said first humidity compensation coefficient data includes a coefficient which is substantially linear with respect to the humidity.

34. An optical apparatus according to claim 30, wherein said second humidity compensation coefficient data includes a coefficient which is substantially linear with respect to the humidity.

35. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism;

storage means for storing control information used for driving said movable lens; and temperature sensing means and humidity sensing means for respectively detecting temperature information and humidity information concerning the temperature and the humidity around a structural member of said optical system other than said plurality of lenses, wherein said control information includes representative position data concerning the position of said movable lens at a predetermined reference temperature and a predetermined reference humidity, temperature compensation coefficient data determined based on data concerning a shift of the focal plane due to a change in the temperature around said structural member and humidity compensation coefficient data determined based on data concerning a shift of the focal plane due to a change in the humidity around said structural member, and wherein said control circuit computes, based on said control information, said temperature information and said humidity information, corrected position data indicative of the amount of driving of said movable lens necessary to compensate for the shift of the focal plane due to change in the temperature and change in the humidity around said structural member, and controls said lens driving mechanism in accordance with said corrected position data so as to compensate for the shift of the focal plane caused by the change in the temperature and the change in the humidity.

36. An optical apparatus according to claim 35, wherein said storage means includes a first storage circuit storing said representative position data and a rewritable second storage circuit storing said temperature compensation coefficient data and said humidity compensation coefficient data.

37. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism;

storage means for storing control information used for driving said movable lens; and environment sensing means for detecting environment information concerning the environment of a structural member of said optical system other than said plurality of lenses, wherein said control information includes representative position data concerning the position of said movable lens at a predetermined reference environment and environment compensation coefficient data determined based on data concerning a shift of the focal plane due to a change in the environment of said structural member, and wherein said control circuit computes, based on said control information and said environment information, corrected position data indicative of the amount of driving of said movable lens necessary to compensate for the shift of the focal plane due to change in the environment of said structural member, and controls said lens driving mechanism in accordance with said corrected position data so as to compensate for the shift of the focal plane caused by the change in the environment.

38. An optical apparatus according to claim 37, wherein said storage means includes a first storage circuit storing said representative position data and a rewritable second storage circuit storing said environment compensation coefficient data.

39. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism;

temperature sensing means for detecting temperature information concerning the temperature around a structural member of said optical system other than said plurality of lenses, wherein said control circuit controls said lens driving mechanism in accordance with control information which includes representative position data concerning the position of said movable lens at a predetermined reference temperature, temperature compensation coefficient reference data determined based on the data concerning a shift of the focal plane due to change in the temperature around said structural member, and coefficient correction data for correcting said temperature compensation coefficient reference data;

said optical apparatus further comprising:

first storage means for storing said representative position data and said temperature compensation coefficient reference data; and rewritable second storage means for storing said coefficient correction data, wherein said control circuit determines temperature compensation coefficient data by multiplying said temperature compensation coefficient reference data concerning said structural member with said coefficient correction data, and computes, based on said control information, said temperature information and said temperature compensation coefficient data, corrected position data indicative of the amount of driving of said movable lens to compensate for the shift of the focal plane due to a change in the temperature, and wherein said control circuit further controls said lens driving mechanism in accordance with said corrected position data so as to compensate for the shift of the focal plane of said optical system caused by the change in the temperature.

40. An optical apparatus according to claim 39, wherein said structural member is a lens holding member which holds at least one of said plurality of lenses.

41. An optical apparatus according to claim 39, wherein said optical system is a rear-focus-type zoom lens.

42. An optical apparatus according to claim 41, wherein said first temperature compensation coefficient data is determined as a function of the position of said movable lens which has a magnification changing function.

43. An optical apparatus according to claim 41, wherein said corrected position data is determined by adding said representative position data indicative of the position of said movable lens at the reference temperature to the product of the difference of the temperature detected by said temperature sensing means from said reference temperature and said temperature compensation coefficient data concerning the structural member.

44. An optical apparatus according to claim 41, wherein at least one of said plurality of lenses includes a plastic element lens.

45. An optical apparatus according to claim 44, further comprising temperature information detecting means for detecting temperature information concerning said plastic element lens, wherein said first storage means stores another temperature compensation coefficient data determined based on data concerning the amount of shift of the focal plane due to a change in the temperature around said plastic element lens, and said control circuit computes another temperature compensation coefficient data by multiplying another temperature compensation coefficient reference data concerning said plastic element lens with said coefficient correction data and further computes said corrected position data by using both said temperature compensation coefficient data concerning the structural member and said another temperature compensation coefficient data concerning said plastic element lens.

46. An optical apparatus according to claim 45, wherein said another temperature compensation coefficient data concerning the plastic element lens is determined as a function of the position of said movable lens.

47. An optical apparatus according to claim 45, wherein said corrected position data is determined by adding said representative position data indicative of the position of said movable lens at the reference temperature to the product of the difference of the temperature detected by said temperature sensing means from said reference temperature and the sum of said temperature compensation coefficient data concerning the structural member and said another temperature compensation coefficient data concerning said plastic element lens.

48. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism; and humidity sensing means for detecting humidity information concerning the humidity around a structural member of said optical system other than said plurality of lenses, wherein said control circuit controls said lens driving mechanism in accordance with control information which includes representative position data concerning the position of said movable lens at a predetermined reference humidity, humidity compensation coefficient reference data determined based on the data concerning a shift of the focal plane due to change in the humidity around said structural member, and coefficient correction data for correcting said humidity compensation coefficient reference data;

said optical apparatus further comprising:

first storage means for storing said representative position data and said humidity compensation coefficient reference data; and rewritable second storage means for storing said coefficient correction data, wherein said control circuit determines humidity compensation coefficient data by multiplying said humidity compensation coefficient reference data concerning said structural member with said coefficient correction data, and computes, based on said control information, said humidity information and said humidity compensation coefficient data, corrected position data indicative of the amount of driving of said movable lens to compensate for the shift of the focal plane due to a change in the humidity, and wherein said control circuit further controls said lens driving mechanism in accordance with said corrected position data so as to compensate for the shift of the focal plane of said optical system caused by the change in the humidity.

49. An optical apparatus according to claim 48, wherein said structural member is a lens holding member which holds at least one of said plurality of lenses.

50. An optical apparatus according to claim 48, wherein said optical system is a rear-focus-type zoom lens.

51. An optical apparatus according to claim 50, wherein said first humidity compensation coefficient data is determined as a function of the position of said movable lens which has a magnification changing function.

52. An optical apparatus according to claim 48, wherein said corrected position data is determined by adding said representative position data indicative of the position of said movable lens at the reference humidity to the product of the difference of the humidity detected by said humidity sensing means from said reference humidity and said humidity compensation coefficient data concerning the structural member.

53. An optical apparatus according to claim 50, wherein at least one of said plurality of lenses includes a plastic element lens.

54. An optical apparatus according to claim 53, further comprising humidity information detecting means for detecting humidity information concerning said plastic element lens, wherein said first storage means stores another humidity compensation coefficient data determined based on data concerning the amount of shift of the focal plane due to a change in the humidity around said plastic element lens, and said control circuit computes another humidity compensation coefficient data by multiplying another humidity compensation coefficient reference data concerning said plastic element lens with said coefficient correction data and further computes said corrected position data by using both said humidity compensation coefficient data concerning the structural member and said another humidity compensation coefficient data concerning said plastic element lens.

55. An optical apparatus according to claim 45, wherein said another humidity compensation coefficient data concerning the plastic element lens is determined as a function of the position of said movable lens.

56. An optical apparatus according to claim 54, wherein said corrected position data is determined by adding said representative position data indicative of the position of said movable lens at the reference humidity to the product of the difference of the humidity detected by said humidity sensing means from said reference humidity and the sum of said humidity compensation coefficient data concerning the structural member and said another humidity compensation coefficient data concerning said plastic element lens.

57. An optical apparatus which forms an image of an object on a focal plane by means of an optical system having a plurality of lenses including at least one movable lens, said optical apparatus comprising:

a lens driving mechanism for driving said movable lens;

a control circuit for controlling said lens driving mechanism; and environment sensing means for detecting environment information concerning the environment of a structural member of said optical system other than said plurality of lenses, wherein said control circuit controls said lens driving mechanism in accordance with control information which includes representative position data concerning the position of said movable lens at a predetermined reference environment, environment compensation coefficient reference data determined based on the data concerning a shift of the focal plane due to change in the environment of said structural member, and coefficient correction data for correcting said environment compensation coefficient reference data;

said optical apparatus further comprising:

first storage means for storing said representative position data and said environment compensation coefficient reference data; and rewritable second storage means for storing said coefficient correction data, wherein said control circuit determines environment compensation coefficient data by multiplying said environment compensation coefficient reference data concerning said structural member with said coefficient correction data, and computes, based on said control information, said environment information and said environment compensation coefficient data, corrected position data indicative of the amount of driving of said movable lens to compensate for the shift of the focal plane due to a change in the environment, and wherein said control circuit further controls said lens driving mechanism in accordance with said corrected position data so as to compensate for the shift of the focal plane of said optical system caused by the change in the environment.

58. An optical apparatus which forms an image of an object on a focal plane by means of an optical system having a plurality of lenses including at least one movable lens, said optical apparatus comprising:

lens driving means for driving said movable lens;

control means for controlling said lens driving means;

storage means for storing control information used for driving said movable lens; and temperature sensing means for detecting temperature information concerning the temperature around a structural member of said optical system other than said plurality of lenses, wherein said control information includes representative position data indicative of the position of said movable lens at a predetermined reference temperature and temperature compensation coefficient data determined based on a shift of the focal plane due to the change in the temperature around said structural member, and wherein said control means performs, based on said control information and said temperature information, compensation for the shift of the focal plane caused by the change in the temperature, thereby effecting adjustment of said optical apparatus while a uniform temperature has been established in said optical apparatus.

59. An optical apparatus according to claim 58, wherein said structural member is a lens holding member which holds at least one of said plurality of lenses.

60. An optical apparatus according to claim 58, wherein said optical system is a rear-focus-type zoom lens.

61. An optical apparatus according to claim 60, wherein said temperature compensation coefficient data is determined as a function of the position of said movable lens which has a magnification changing function.

62. An optical apparatus according to claim 58, wherein at least one of said plurality of lenses includes a plastic element lens.

63. An optical apparatus according to claim 62, wherein said control information further includes another temperature compensation coefficient data determined based on data concerning the amount of shift of the focal plane due to a change in the temperature around said plastic element lens, and said corrected position data is computed by using both said temperature compensation coefficient data concerning the structural member and said another temperature compensation coefficient data concerning said plastic element lens.

64. An optical apparatus which forms an image of an object on a focal plane by means of an optical system having a plurality of lenses including at least one movable lens, said optical apparatus comprising:

lens driving means for driving said movable lens;

control means for controlling said lens driving means;

storage means for storing control information used for driving said movable lens; and humidity sensing means for detecting humidity information concerning the humidity around a structural member of said optical system other than said plurality of lenses, wherein said control information includes representative position data indicative of the position of said movable lens at a predetermined reference humidity and humidity compensation coefficient data determined based on a shift of the focal plane due to the change in the humidity around said structural member, and wherein said control means performs, based on said control information and said humidity information, compensation for the shift of the focal plane caused by the change in the humidity, thereby effecting adjustment of said optical apparatus while a uniform humidity has been established in said optical apparatus.

65. An optical apparatus according to claim 64, wherein said structural member is a lens holding member which holds at least one of said plurality of lenses.

66. An optical apparatus according to claim 64, wherein said optical system is a rear-focus-type zoom lens.

67. An optical apparatus according to claim 66, wherein said humidity compensation coefficient data is determined as a function of the position of said movable lens which has a magnification changing function.

68. An optical apparatus according to claim 64, wherein at least one of said plurality of lenses includes a plastic element lens.

69. An optical apparatus according to claim 68, wherein said control information further includes another humidity compensation coefficient data determined based on data concerning the amount of shift of the focal plane due to a change in the humidity around said plastic element lens, and said corrected position data is computed by using both said humidity compensation coefficient data concerning the structural member and said another humidity compensation coefficient data concerning said plastic element lens.

70. An optical apparatus which forms an image of an object on a focal plane by means of an optical system having a plurality of lenses including at least one movable lens, said optical apparatus comprising:

lens driving means for driving said movable lens;

control means for controlling said lens driving means;

storage means for storing control information used for driving said movable lens; and environment sensing means for detecting environment information concerning the environment of a structural member of said optical system other than said plurality of lenses, wherein said control information includes representative position data indicative of the position of said movable lens at a predetermined reference environment and environment compensation coefficient data determined based on a shift of the focal plane due to a change in the environment of said structural member, and wherein said control means performs, based on said control information and said environment information, compensation for the shift of the focal plane caused by the change in the environment, thereby effecting adjustment of said optical apparatus while a uniform environment has been established in said optical apparatus.

71. An optical apparatus which forms an image of an object on a focal plane by means of an optical system having a plurality of lenses including at least one movable lens, said optical apparatus comprising:

lens driving means for driving said movable lens;

control means for controlling said lens driving means;

storage means for storing control information used for driving said movable lens; and environment sensing means for detecting environment information concerning the environment of a structural member of said optical system other than said plurality of lenses, wherein said control information includes representative position data indicative of the position of said movable lens at a predetermined reference environment and environment compensation coefficient data determined based on a shift of the focal plane due to a change in the environment of said structural member, and wherein said control means performs, based on said control information and said environment information, compensation for the shift of the focal plane caused by the change in the environment, thereby effecting adjustment of said optical apparatus while said optical apparatus has been placed under the environment of use of said optical apparatus.

72. An optical apparatus which forms an image of an object on a focal plane by means of an optical system having a plurality of lenses including at least one movable lens, said optical apparatus comprising:

lens driving means for driving said movable lens;

control means for controlling said lens driving means;

temperature sensing means for detecting temperature information concerning the temperature around a structural member of said optical system other than said plurality of lenses; and humidity sensing means for detecting humidity information concerning the humidity around said structural member, wherein said control means controls said lens driving means in accordance with control information which includes representative position data concerning the position of said movable lens at a predetermined reference temperature and a predetermined reference humidity, temperature compensation coefficient reference data determined based on the data concerning a shift of the focal plane due to change in the temperature around said structural member, humidity compensation coefficient reference data determined based on the data concerning a shift of the focal plane due to change in the humidity around said structural member, coefficient correction data A for correcting said temperature compensation coefficient reference data and coefficient correction data B for correcting said humidity compensation coefficient reference data;

said optical apparatus further comprising:

first storage means for storing said representative position data, said temperature compensation coefficient reference data, and said humidity compensation reference data; and rewritable second storage means for storing said coefficient correction data A for correcting said temperature compensation coefficient reference data and said coefficient correction data B for correcting said humidity compensation coefficient reference data, wherein said control means determines temperature compensation coefficient data concerning the structural member by multiplying said temperature compensation coefficient reference data concerning said structural member with said coefficient correction data A and determines humidity compensation coefficient data by multiplying said humidity compensation coefficient reference data with said coefficient correction data B, and computes, based on said control information, said temperature information, said temperature compensation coefficient data, said humidity information and said humidity compensation coefficient data, corrected position data indicative of the amount of driving of said movable lens to compensate for the shift of the focal plane due to a change in the temperature and a change in the humidity, and wherein said control means further controls said lens driving means in accordance with said corrected position data so as to compensate for the shift of the focal plane of said optical system caused by the change in the temperature and the change in the humidity.

* * * * *

UNITED STATES PATENT AND TRADEMARK OFFICE
CERTIFICATE OF CORRECTION

PATENT NO. : 5,895,129

DATED : April 20, 1999

INVENTOR(S) : Seiya OHTA

It is certified that error appears in the above-identified patent and that said Letters Patent is hereby corrected as shown below:

COLUMN 1:

Line 48, "shows" should read --show--.

COLUMN 2:

Line 11, "circumstance," should read --circumstances,--.

COLUMN 5:

Line 57, "regar" should read --regard--.

COLUMN 15:

Line 23, "group" should read --groups--.

COLUMN 16:

Line 58, "group" should read --groups--.

COLUMN 22:

Line 30, "The" should read --the--.

UNITED STATES PATENT AND TRADEMARK OFFICE
CERTIFICATE OF CORRECTION

PATENT NO. : 5,895,129

DATED : April 20, 1999

INVENTOR(S) : Seiya OHTA

It is certified that error appears in the above-identified patent and that said Letters Patent is hereby corrected as shown below:

COLUMN 23:

Line 13, "a changes" should read --changes--.

Signed and Sealed this

Twenty-fourth Day of October, 2000

Attest:

Q. TODD DICKINSON

*Attesting Officer*                *Director of Patents and Trademarks*